(12) United States Patent
LaJoie

(10) Patent No.: US 12,363,383 B2
(45) Date of Patent: Jul. 15, 2025

(54) METHODS AND APPARATUS FOR PROVIDING AND UPLOADING CONTENT TO PERSONALIZED NETWORK STORAGE

(71) Applicant: Time Warner Cable Enterprises LLC, St. Louis, MO (US)

(72) Inventor: Michael L. LaJoie, Stamford, CT (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 495 days.

(21) Appl. No.: 17/385,710

(22) Filed: Jul. 26, 2021

(65) Prior Publication Data

US 2021/0352370 A1    Nov. 11, 2021

Related U.S. Application Data

(60) Continuation of application No. 15/969,597, filed on May 2, 2018, now Pat. No. 11,076,203, which is a
(Continued)

(51) Int. Cl.
*H04N 21/4627* (2011.01)
*G06F 21/10* (2013.01)
(Continued)

(52) U.S. Cl.
CPC ......... *H04N 21/4627* (2013.01); *G06F 21/10* (2013.01); *H04L 63/0428* (2013.01);
(Continued)

(58) Field of Classification Search
None
See application file for complete search history.

(56) References Cited

U.S. PATENT DOCUMENTS

| 3,388,376 A | 6/1968 | Magee |
| 4,355,415 A | 10/1982 | George et al. |
(Continued)

FOREIGN PATENT DOCUMENTS

| CA | 2376550 A1 | 12/2000 |
| CA | 2376550 C | 8/2008 |
(Continued)

OTHER PUBLICATIONS

3 Point Digital to Showcase Revolutionary Video-On-Demand at Streaming Media West '99, http://www.vsoftcom/press 1999nhtm, Dec. 3, 1999.
(Continued)

*Primary Examiner* — William J Kim
(74) *Attorney, Agent, or Firm* — Patent Beach PC

(57) ABSTRACT

Methods and apparatus for delivering, uploading, and storing content for users of a network so that the user has "virtual" ownership of and access to the content, thereby obviating the need for additional storage space at the client premises and offering seamless compliance with copyright laws. In an exemplary embodiment, the network comprises a hybrid fiber coax (HFC) network, and sessions are used to deliver content to the requesting owner and then back to storage space associated with the head-end where the content remains available for future subscriber requests. Various other complementary features for enhancing the user's virtual ownership experience are also disclosed.

21 Claims, 10 Drawing Sheets

Related U.S. Application Data division of application No. 13/797,577, filed on Mar. 12, 2013, now abandoned.

(51) Int. Cl.
*H04L 9/40* (2022.01)
*H04N 21/2743* (2011.01)
*H04N 21/44* (2011.01)
*H04N 21/443* (2011.01)

(52) U.S. Cl.
CPC ......... *H04N 21/2743* (2013.01); *H04N 21/44* (2013.01); *H04N 21/4432* (2013.01)

(56) References Cited

U.S. PATENT DOCUMENTS

| | | |
|---|---|---|
| 4,384,610 A | 5/1983 | Cook et al. |
| 4,534,056 A | 8/1985 | Feilchenfeld et al. |
| 4,546,382 A | 10/1985 | McKenna et al. |
| 4,577,177 A | 3/1986 | Marubashi |
| 4,602,279 A | 7/1986 | Freeman |
| 4,694,490 A | 9/1987 | Harvey et al. |
| 4,696,578 A | 9/1987 | Mansuria et al. |
| 4,708,224 A | 11/1987 | Schrooder |
| 4,749,062 A | 6/1988 | Tsuji et al. |
| 4,902,732 A | 2/1990 | Itoh et al. |
| 4,905,080 A | 2/1990 | Watanabe et al. |
| 4,908,707 A | 3/1990 | Kinghorn |
| 4,930,120 A | 5/1990 | Baxter et al. |
| 4,930,158 A | 5/1990 | Vogel |
| 4,959,720 A | 9/1990 | Duffield et al. |
| 4,975,909 A | 12/1990 | Masson et al. |
| 4,977,455 A | 12/1990 | Young |
| 4,979,593 A | 12/1990 | Watanabe et al. |
| 4,995,479 A | 2/1991 | Fujiwara et al. |
| 5,042,620 A | 8/1991 | Yoneda et al. |
| 5,047,867 A | 9/1991 | Strubbe et al. |
| 5,056,629 A | 10/1991 | Tsuji et al. |
| 5,086,450 A | 2/1992 | Kitagawa et al. |
| 5,155,591 A | 10/1992 | Wachob |
| 5,159,163 A | 10/1992 | Bahjat et al. |
| 5,172,413 A | 12/1992 | Bradley et al. |
| 5,200,583 A | 4/1993 | Kupersmith et al. |
| 5,200,822 A | 4/1993 | Bronfin et al. |
| 5,253,066 A | 10/1993 | Vogel et al. |
| 5,255,341 A | 10/1993 | Nakajima |
| 5,285,272 A | 2/1994 | Bradley et al. |
| 5,287,266 A | 2/1994 | Malec et al. |
| 5,290,710 A | 3/1994 | Haj-Ali-Ahmadi et al. |
| 5,295,064 A | 3/1994 | Malec et al. |
| 5,335,277 A | 8/1994 | Harvey et al. |
| 5,357,276 A | 10/1994 | Banker et al. |
| 5,369,707 A | 11/1994 | Follendore, III |
| 5,371,532 A | 12/1994 | Gelman et al. |
| 5,371,551 A | 12/1994 | Logan et al. |
| 5,373,315 A | 12/1994 | Dufresne et al. |
| 5,394,182 A | 2/1995 | Klappert et al. |
| 5,412,720 A | 5/1995 | Hoarty |
| 5,414,455 A | 5/1995 | Hooper et al. |
| 5,442,389 A | 8/1995 | Blahut et al. |
| 5,461,415 A | 10/1995 | Wolf et al. |
| 5,463,209 A | 10/1995 | Figh et al. |
| 5,479,266 A | 12/1995 | Young et al. |
| 5,479,268 A | 12/1995 | Young et al. |
| 5,481,294 A | 1/1996 | Thomas et al. |
| 5,485,897 A | 1/1996 | Matsumoto et al. |
| 5,497,185 A | 3/1996 | Dufresne et al. |
| 5,512,934 A | 4/1996 | Kochanski |
| 5,515,510 A | 5/1996 | Kikinis |
| 5,517,257 A | 5/1996 | Dunn et al. |
| 5,524,195 A | 6/1996 | Clanton, III et al. |
| 5,528,282 A | 6/1996 | Voeten et al. |
| 5,528,284 A | 6/1996 | Iwami et al. |
| 5,534,911 A | 7/1996 | Levitan |
| 5,535,206 A | 7/1996 | Bestler et al. |
| 5,541,738 A | 7/1996 | Mankovitz |
| 5,551,532 A | 9/1996 | Kupersmith |
| 5,577,209 A | 11/1996 | Boyle et al. |
| 5,583,561 A | 12/1996 | Baker et al. |
| 5,583,563 A | 12/1996 | Wanderscheid et al. |
| 5,585,838 A | 12/1996 | Lawler et al. |
| 5,589,892 A | 12/1996 | Knee et al. |
| 5,592,551 A | 1/1997 | Lett et al. |
| 5,600,364 A | 2/1997 | Hendricks et al. |
| 5,606,154 A | 2/1997 | Doigan et al. |
| 5,610,653 A | 3/1997 | Abecassis |
| 5,619,247 A | 4/1997 | Russo |
| 5,619,249 A | 4/1997 | Billock et al. |
| 5,625,405 A | 4/1997 | Dulac et al. |
| 5,652,615 A | 7/1997 | Bryant et al. |
| 5,657,072 A | 8/1997 | Aristides et al. |
| 5,659,350 A | 8/1997 | Hendricks et al. |
| 5,671,225 A | 9/1997 | Hooper et al. |
| 5,675,647 A | 10/1997 | Garneau et al. |
| 5,682,597 A | 10/1997 | Ganek et al. |
| 5,684,714 A | 11/1997 | Yogeshwar et al. |
| 5,684,963 A | 11/1997 | Clement |
| 5,689,094 A | 11/1997 | Friedli et al. |
| 5,701,383 A | 12/1997 | Russo et al. |
| 5,708,961 A | 1/1998 | Hylton et al. |
| 5,710,970 A | 1/1998 | Walters et al. |
| 5,715,403 A | 2/1998 | Stefik |
| 5,721,878 A | 2/1998 | Ottesen et al. |
| 5,724,646 A | 3/1998 | Ganek et al. |
| 5,729,280 A | 3/1998 | Inoue et al. |
| 5,729,648 A | 3/1998 | Boyce et al. |
| 5,748,254 A | 5/1998 | Harrison et al. |
| 5,749,443 A | 5/1998 | Romao |
| 5,751,282 A | 5/1998 | Girard et al. |
| 5,758,257 A | 5/1998 | Herz et al. |
| 5,761,607 A | 6/1998 | Gudesen |
| 5,771,354 A | 6/1998 | Crawford |
| 5,771,435 A | 6/1998 | Brown |
| 5,774,170 A | 6/1998 | Hite et al. |
| 5,778,181 A | 7/1998 | Hidary et al. |
| 5,778,187 A | 7/1998 | Monteiro et al. |
| 5,781,228 A | 7/1998 | Sposato |
| 5,793,409 A | 8/1998 | Tetsumura |
| 5,793,971 A | 8/1998 | Fujita et al. |
| 5,794,217 A | 8/1998 | Allen |
| 5,805,154 A | 9/1998 | Brown |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,642 A | 9/1998 | Leroy |
| 5,815,146 A | 9/1998 | Youden et al. |
| 5,815,148 A | 9/1998 | Tanaka |
| 5,818,438 A | 10/1998 | Howe et al. |
| 5,818,440 A | 10/1998 | Allibhoy et al. |
| 5,818,510 A | 10/1998 | Cobbley et al. |
| 5,819,034 A | 10/1998 | Joseph et al. |
| 5,822,530 A | 10/1998 | Brown |
| 5,826,168 A | 10/1998 | Inoue et al. |
| 5,828,832 A | 10/1998 | Holden et al. |
| 5,832,231 A | 11/1998 | Raman et al. |
| 5,835,125 A | 11/1998 | Bhagavath |
| 5,841,468 A | 11/1998 | Wright |
| 5,844,181 A | 12/1998 | Amo et al. |
| 5,844,897 A | 12/1998 | Asamizuya |
| 5,847,703 A | 12/1998 | Teicher et al. |
| 5,850,218 A | 12/1998 | Lajoie et al. |
| 5,861,881 A | 1/1999 | Freeman et al. |
| 5,864,176 A | 1/1999 | Babock et al. |
| 5,870,474 A | 2/1999 | Wasilewski et al. |
| 5,887,139 A | 3/1999 | Madison, Jr. et al. |
| 5,887,243 A | 3/1999 | Harvey et al. |
| 5,892,535 A | 4/1999 | Allen et al. |
| 5,892,900 A | 4/1999 | Ginter et al. |
| 5,892,915 A | 4/1999 | Duso et al. |
| 5,896,454 A | 4/1999 | Cookson et al. |
| 5,897,635 A | 4/1999 | Torres et al. |
| 5,909,638 A | 6/1999 | Allen |

(56) References Cited

U.S. PATENT DOCUMENTS

| | | |
|---|---|---|
| 5,914,945 A | 6/1999 | Abu-Amara et al. |
| 5,917,538 A | 6/1999 | Asamizuya |
| 5,918,222 A | 6/1999 | Fukui et al. |
| 5,918,665 A | 7/1999 | Babcock et al. |
| 5,930,473 A | 7/1999 | Teng et al. |
| 5,930,893 A | 8/1999 | Eaton |
| 5,932,853 A | 8/1999 | Friedli et al. |
| 5,940,370 A | 8/1999 | Curtis et al. |
| 5,955,710 A | 9/1999 | Difranza |
| 5,956,716 A | 9/1999 | Kenner et al. |
| 5,960,411 A | 9/1999 | Hartman et al. |
| 5,970,206 A | 10/1999 | Yuen et al. |
| 5,974,299 A | 10/1999 | Massetti |
| 5,979,757 A | 11/1999 | Tracy et al. |
| 5,982,412 A | 11/1999 | Nulty |
| 5,984,051 A | 11/1999 | Morgan et al. |
| 5,991,308 A | 11/1999 | Fuhrmann et al. |
| 5,995,708 A | 11/1999 | Corey |
| 6,002,393 A | 12/1999 | Hite et al. |
| 6,005,603 A | 12/1999 | Flavin |
| 6,005,643 A | 12/1999 | Morimoto et al. |
| 6,006,265 A | 12/1999 | Rangan et al. |
| 6,009,098 A | 12/1999 | Asamizuya |
| 6,009,103 A | 12/1999 | Woundy |
| 6,011,839 A | 1/2000 | Friedli et al. |
| 6,016,509 A | 1/2000 | Dedrick |
| 6,018,509 A | 1/2000 | Itoh et al. |
| 6,029,045 A | 2/2000 | Picco et al. |
| 6,047,327 A | 4/2000 | Tso et al. |
| 6,052,145 A | 4/2000 | Macrae et al. |
| 6,057,832 A | 5/2000 | Lev et al. |
| 6,058,380 A | 5/2000 | Anderson et al. |
| 6,069,023 A | 5/2000 | Bernier et al. |
| 6,073,160 A | 6/2000 | Grantham et al. |
| 6,073,727 A | 6/2000 | Difranza et al. |
| 6,078,928 A | 6/2000 | Schnase et al. |
| 6,081,830 A | 6/2000 | Schindler |
| 6,082,500 A | 7/2000 | Amo et al. |
| 6,088,722 A | 7/2000 | Herz et al. |
| 6,091,883 A | 7/2000 | Artigalas et al. |
| 6,092,197 A | 7/2000 | Coueignoux |
| 6,097,431 A | 8/2000 | Anderson et al. |
| 6,112,192 A | 8/2000 | Capek |
| 6,134,532 A | 10/2000 | Lazarus et al. |
| 6,137,793 A | 10/2000 | Gorman et al. |
| 6,144,401 A | 11/2000 | Casement et al. |
| 6,148,400 A | 11/2000 | Arnold |
| 6,154,844 A | 11/2000 | Touboul et al. |
| 6,157,719 A | 12/2000 | Wasilewski et al. |
| 6,160,989 A | 12/2000 | Hendricks et al. |
| 6,161,142 A | 12/2000 | Wolfe et al. |
| 6,167,188 A | 12/2000 | Young et al. |
| 6,167,432 A | 12/2000 | Jiang |
| 6,167,521 A | 12/2000 | Smith et al. |
| 6,169,570 B1 | 1/2001 | Suzuki |
| 6,177,931 B1 | 1/2001 | Alexander et al. |
| 6,181,697 B1 | 1/2001 | Nurenberg et al. |
| 6,182,050 B1 | 1/2001 | Ballard |
| 6,202,008 B1 | 3/2001 | Beckert et al. |
| 6,202,210 B1 | 3/2001 | Ludtke |
| 6,202,799 B1 | 3/2001 | Drop |
| 6,206,142 B1 | 3/2001 | Meacham |
| 6,208,335 B1 | 3/2001 | Gordon et al. |
| 6,212,636 B1 | 4/2001 | Boyle et al. |
| 6,216,129 B1 | 4/2001 | Eldering |
| 6,219,710 B1 | 4/2001 | Gray et al. |
| 6,223,160 B1 | 4/2001 | Kostka et al. |
| 6,233,341 B1 | 5/2001 | Riggins |
| 6,233,389 B1 | 5/2001 | Barton et al. |
| 6,233,687 B1 | 5/2001 | White |
| 6,236,968 B1 | 5/2001 | Kanevsky et al. |
| 6,240,401 B1 | 5/2001 | Oren et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,286,041 B1 | 9/2001 | Collins, III et al. |
| 6,292,624 B1 | 9/2001 | Saib et al. |
| 6,321,257 B1 | 11/2001 | Kotola et al. |
| 6,324,338 B1 | 11/2001 | Wood et al. |
| 6,327,418 B1 | 12/2001 | Barton |
| 6,341,668 B1 | 1/2002 | Fayette et al. |
| 6,343,313 B1 | 1/2002 | Salesky et al. |
| 6,343,647 B2 | 2/2002 | Kim et al. |
| 6,349,797 B1 | 2/2002 | Newville et al. |
| 6,369,840 B1 | 4/2002 | Barnett et al. |
| 6,378,035 B1 | 4/2002 | Parry et al. |
| 6,378,129 B1 | 4/2002 | Zetts |
| 6,397,976 B1 | 6/2002 | Hale et al. |
| 6,421,305 B1 | 7/2002 | Gioscia et al. |
| 6,434,562 B1 | 8/2002 | Pennywitt et al. |
| 6,446,261 B1 | 9/2002 | Rosser |
| 6,456,716 B1 | 9/2002 | Arnold |
| RE37,881 E | 10/2002 | Haines |
| 6,460,036 B1 | 10/2002 | Herz |
| 6,463,585 B1 | 10/2002 | Hendricks et al. |
| 6,466,232 B1 | 10/2002 | Newell et al. |
| 6,467,089 B1 | 10/2002 | Aust et al. |
| 6,470,378 B1 | 10/2002 | Tracton et al. |
| 6,504,571 B1 | 1/2003 | Narayanaswami et al. |
| 6,519,062 B1 | 2/2003 | Yoo |
| 6,523,696 B1 | 2/2003 | Saito et al. |
| 6,549,718 B1 | 4/2003 | Grooters et al. |
| 6,553,178 B2 | 4/2003 | Abecassis |
| 6,560,203 B1 | 5/2003 | Beser et al. |
| 6,560,578 B2 | 5/2003 | Eldering |
| 6,567,980 B1 | 5/2003 | Jain et al. |
| 6,571,279 B1 | 5/2003 | Herz et al. |
| 6,574,617 B1 | 6/2003 | Immerman et al. |
| 6,578,054 B1 | 6/2003 | Hopmann et al. |
| 6,587,835 B1 | 7/2003 | Treyz et al. |
| 6,588,015 B1 | 7/2003 | Eyer et al. |
| 6,591,420 B1 | 7/2003 | McPherson et al. |
| 6,598,228 B2 | 7/2003 | Hejna et al. |
| 6,601,171 B1 | 7/2003 | Carter et al. |
| 6,604,138 B1 | 8/2003 | Virine et al. |
| 6,611,654 B1 | 8/2003 | Shteyn |
| 6,615,039 B1 | 9/2003 | Eldering |
| 6,615,175 B1 | 9/2003 | Gazdzinski |
| 6,615,251 B1 | 9/2003 | Klug et al. |
| 6,622,305 B1 | 9/2003 | Willard |
| 6,640,145 B2 | 10/2003 | Hoffberg et al. |
| 6,647,548 B1 | 11/2003 | Lu et al. |
| 6,651,045 B1 | 11/2003 | Macaulay |
| 6,657,991 B1 | 12/2003 | Akgun et al. |
| 6,671,736 B2 | 12/2003 | Virine et al. |
| 6,671,879 B1 | 12/2003 | Schlarb et al. |
| 6,681,393 B1 | 1/2004 | Bauminger et al. |
| 6,687,735 B1 | 2/2004 | Logston et al. |
| 6,694,145 B2 | 2/2004 | Riikonen et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,741,980 B1 | 5/2004 | Langseth et al. |
| 6,742,116 B1 | 5/2004 | Matsui et al. |
| 6,757,796 B1 | 6/2004 | Hofmann |
| 6,760,768 B2 | 7/2004 | Holden et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,434 B1 | 8/2004 | Godwin |
| 6,774,926 B1 | 8/2004 | Ellis et al. |
| 6,775,778 B1 | 8/2004 | Laczko, Sr. et al. |
| 6,782,475 B1 | 8/2004 | Sumner |
| 6,782,550 B1 | 8/2004 | Cao |
| 6,785,810 B1 | 8/2004 | Lirov et al. |
| 6,788,676 B2 | 9/2004 | Partanen et al. |
| 6,792,577 B1 | 9/2004 | Kimoto |
| 6,801,792 B1 | 10/2004 | Schuster et al. |
| 6,802,077 B1 | 10/2004 | Schlarb |
| 6,807,573 B2 | 10/2004 | Saito et al. |
| 6,810,528 B1 | 10/2004 | Chatani |
| 6,813,505 B2 | 11/2004 | Walley et al. |
| 6,813,776 B2 | 11/2004 | Chernock et al. |
| 6,817,028 B1 | 11/2004 | Jerding et al. |

(56) References Cited

U.S. PATENT DOCUMENTS

| | | |
|---|---|---|
| 6,826,267 B2 | 11/2004 | Daum et al. |
| 6,832,259 B2 | 12/2004 | Hymel et al. |
| 6,851,063 B1 | 2/2005 | Boyle et al. |
| 6,853,731 B1 | 2/2005 | Boyle et al. |
| 6,857,132 B1 | 2/2005 | Rakib et al. |
| 6,859,535 B1 | 2/2005 | Tatebayashi et al. |
| 6,859,845 B2 | 2/2005 | Mate |
| 6,898,708 B2 | 5/2005 | Hori et al. |
| 6,898,762 B2 | 5/2005 | Ellis et al. |
| 6,909,726 B1 | 6/2005 | Sheeran |
| 6,909,837 B1 | 6/2005 | Unger |
| 6,910,064 B1 | 6/2005 | Astarabadi et al. |
| 6,914,446 B1 | 7/2005 | Tustaniwskyj et al. |
| 6,915,528 B1 | 7/2005 | McKenna, Jr. |
| 6,920,565 B2 | 7/2005 | Isaacson et al. |
| 6,925,257 B2 | 8/2005 | Yoo |
| 6,934,880 B2 | 8/2005 | Hofner |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,959,288 B1 | 10/2005 | Medina et al. |
| 6,973,576 B2 | 12/2005 | Giobbi |
| 6,975,730 B1 | 12/2005 | Kuroiwa et al. |
| 6,975,850 B1 | 12/2005 | Hurtta et al. |
| 6,978,370 B1 | 12/2005 | Kocher |
| 6,985,355 B2 | 1/2006 | Allirot |
| 6,990,312 B1 | 1/2006 | Gioscia et al. |
| 6,990,680 B1 | 1/2006 | Wugofski |
| 6,996,544 B2 | 2/2006 | Sellars et al. |
| 7,004,243 B1 | 2/2006 | Babcock et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,376 B1 | 3/2006 | Goldenberg et al. |
| 7,016,963 B1 | 3/2006 | Judd et al. |
| 7,017,179 B1 | 3/2006 | Asamoto et al. |
| 7,017,189 B1 | 3/2006 | Demello et al. |
| 7,020,892 B2 | 3/2006 | Levesque et al. |
| 7,024,466 B2 | 4/2006 | Outten et al. |
| 7,024,678 B2 | 4/2006 | Gordon et al. |
| 7,025,209 B2 | 4/2006 | Hawkins |
| 7,027,460 B2 | 4/2006 | Iyer et al. |
| 7,028,009 B2 | 4/2006 | Wang et al. |
| 7,028,329 B1 | 4/2006 | Mizutani |
| 7,039,048 B1 | 5/2006 | Monta et al. |
| 7,039,928 B2 | 5/2006 | Kamada et al. |
| 7,054,443 B1 | 5/2006 | Jakubowski et al. |
| 7,054,843 B1 | 5/2006 | Charas |
| 7,054,902 B2 | 5/2006 | Toporek et al. |
| 7,055,040 B2 | 5/2006 | Klemba et al. |
| 7,058,685 B1 | 6/2006 | Van Zee et al. |
| 7,058,810 B2 | 6/2006 | Kumazawa et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,577 B2 | 6/2006 | Geile et al. |
| 7,069,578 B1 | 6/2006 | Prus et al. |
| 7,072,950 B2 | 7/2006 | Toft |
| 7,073,189 B2 | 7/2006 | McElhatten et al. |
| 7,073,193 B2 | 7/2006 | Marsh |
| 7,073,199 B1 | 7/2006 | Raley |
| 7,075,945 B2 | 7/2006 | Arsenault et al. |
| 7,080,397 B2 | 7/2006 | Cochran et al. |
| 7,080,400 B1 | 7/2006 | Navar |
| 7,092,397 B1 | 8/2006 | Chandran et al. |
| 7,099,308 B2 | 8/2006 | Merrill et al. |
| 7,100,183 B2 | 8/2006 | Kunkel et al. |
| 7,103,181 B2 | 9/2006 | Ananth |
| 7,103,905 B2 | 9/2006 | Novak |
| 7,103,906 B1 | 9/2006 | Katz et al. |
| 7,106,382 B2 | 9/2006 | Shiotsu |
| 7,107,326 B1 | 9/2006 | Fijolek et al. |
| 7,109,848 B2 | 9/2006 | Schybergson |
| 7,124,195 B2 | 10/2006 | Roach et al. |
| 7,136,573 B2 | 11/2006 | Kikuchi et al. |
| 7,136,853 B1 | 11/2006 | Kohda et al. |
| 7,137,728 B2 | 11/2006 | Witham et al. |
| 7,143,431 B1 | 11/2006 | Eager et al. |
| 7,146,627 B1 | 12/2006 | Ismail et al. |
| 7,146,630 B2 | 12/2006 | Dravida et al. |
| 7,149,772 B1 | 12/2006 | Kalavade |
| 7,152,237 B2 | 12/2006 | Flickinger et al. |
| 7,154,912 B2 | 12/2006 | Chong et al. |
| 7,155,226 B1 | 12/2006 | Oh et al. |
| 7,155,508 B2 | 12/2006 | Sankuratripati et al. |
| 7,159,235 B2 | 1/2007 | Son et al. |
| 7,165,268 B1 | 1/2007 | Moore et al. |
| 7,171,485 B2 | 1/2007 | Roach et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,184,526 B1 | 2/2007 | Cook |
| 7,191,244 B2 | 3/2007 | Jennings et al. |
| 7,194,001 B2 | 3/2007 | Leatherbury et al. |
| 7,194,009 B2 | 3/2007 | Eng |
| 7,194,756 B2 | 3/2007 | Addington et al. |
| 7,197,472 B2 | 3/2007 | Conkwright et al. |
| 7,203,185 B1 | 4/2007 | Dhara et al. |
| 7,203,311 B1 | 4/2007 | Kahn et al. |
| 7,209,458 B2 | 4/2007 | Ahvonen et al. |
| 7,209,892 B1 | 4/2007 | Galuten et al. |
| 7,212,543 B1 | 5/2007 | Arwald et al. |
| 7,213,742 B1 | 5/2007 | Birch et al. |
| 7,216,170 B2 | 5/2007 | Ludvig et al. |
| 7,222,078 B2 | 5/2007 | Abelow |
| 7,225,333 B2 | 5/2007 | Peinado et al. |
| 7,228,427 B2 | 6/2007 | Fransdonk |
| 7,228,555 B2 | 6/2007 | Schlack |
| 7,231,669 B2 | 6/2007 | Leung et al. |
| 7,233,948 B1 | 6/2007 | Shamoon et al. |
| 7,237,112 B1 | 6/2007 | Ishiguro et al. |
| 7,237,250 B2 | 6/2007 | Kanojia et al. |
| 7,240,196 B2 | 7/2007 | Cooper et al. |
| 7,242,960 B2 | 7/2007 | Van Rooyen et al. |
| 7,246,150 B1 | 7/2007 | Donoho et al. |
| 7,246,172 B2 | 7/2007 | Yoshiba et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,257,308 B2 | 8/2007 | Plourde et al. |
| 7,263,187 B2 | 8/2007 | Pedlow et al. |
| 7,263,188 B2 | 8/2007 | Kohno |
| 7,266,198 B2 | 9/2007 | Medvinsky |
| 7,266,726 B1 | 9/2007 | Ladd et al. |
| 7,266,832 B2 | 9/2007 | Miller |
| 7,266,836 B2 | 9/2007 | Anttila et al. |
| 7,269,854 B2 | 9/2007 | Simmons et al. |
| 7,280,737 B2 | 10/2007 | Smith |
| 7,281,261 B2 | 10/2007 | Jaff et al. |
| 7,289,534 B1 | 10/2007 | Bailey et al. |
| 7,299,502 B2 | 11/2007 | Schmeling et al. |
| 7,301,944 B1 | 11/2007 | Redmond |
| 7,305,357 B2 | 12/2007 | Hamilton |
| 7,305,460 B2 | 12/2007 | Park |
| 7,305,691 B2 | 12/2007 | Cristofalo |
| 7,313,611 B1 | 12/2007 | Jacobs et al. |
| 7,315,886 B1 | 1/2008 | Meenan et al. |
| 7,317,728 B2 | 1/2008 | Acharya et al. |
| 7,320,134 B1 | 1/2008 | Tomsen et al. |
| 7,321,923 B1 | 1/2008 | Rosenberg et al. |
| 7,324,531 B2 | 1/2008 | Cho |
| 7,325,073 B2 | 1/2008 | Shao et al. |
| 7,327,692 B2 | 2/2008 | Ain et al. |
| 7,330,483 B1 | 2/2008 | Peters, Jr. et al. |
| 7,330,875 B1 | 2/2008 | Parasnis et al. |
| 7,330,967 B1 | 2/2008 | Pujare et al. |
| 7,337,147 B2 | 2/2008 | Chen et al. |
| 7,337,459 B1 | 2/2008 | Tsutsui et al. |
| 7,340,510 B1 | 3/2008 | Liskov et al. |
| 7,340,760 B2 | 3/2008 | Wachtfogel et al. |
| 7,346,558 B2 | 3/2008 | Rosenberg |

(56) References Cited

U.S. PATENT DOCUMENTS

| | | |
|---|---|---|
| 7,346,630 B2 | 3/2008 | Eichstaedt et al. |
| 7,352,775 B2 | 4/2008 | Powell |
| 7,353,543 B2 | 4/2008 | Ohmori et al. |
| 7,355,980 B2 | 4/2008 | Bauer et al. |
| 7,356,751 B1 | 4/2008 | Levitan |
| 7,360,233 B2 | 4/2008 | Russ et al. |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,373,506 B2 | 5/2008 | Asano et al. |
| 7,373,594 B1 | 5/2008 | Lopez et al. |
| 7,376,386 B2 | 5/2008 | Phillips et al. |
| 7,376,976 B2 | 5/2008 | Fierstein et al. |
| 7,383,228 B2 | 6/2008 | Lisanke et al. |
| 7,386,621 B1 | 6/2008 | Hlasny |
| 7,397,825 B2 | 7/2008 | Woodward, Jr. et al. |
| 7,406,099 B2 | 7/2008 | Schlagintweit |
| 7,409,546 B2 | 8/2008 | Platt |
| 7,438,233 B2 | 10/2008 | Leiper |
| 7,441,037 B2 | 10/2008 | Saxena |
| 7,457,520 B2 | 11/2008 | Rosetti et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,496,647 B2 | 2/2009 | Karaoguz et al. |
| 7,506,367 B1 | 3/2009 | Ishibashi |
| 7,512,638 B2 | 3/2009 | Jhaveri et al. |
| 7,533,376 B2 | 5/2009 | Anwar et al. |
| 7,565,672 B2 | 7/2009 | Yun |
| 7,567,262 B1 | 7/2009 | Clemens et al. |
| 7,567,988 B2 | 7/2009 | Wolf et al. |
| 7,577,118 B2 | 8/2009 | Haumonte et al. |
| 7,587,172 B2 | 9/2009 | Kim et al. |
| 7,587,563 B1 * | 9/2009 | Teterin .................. G06F 16/18 711/161 |
| 7,592,912 B2 | 9/2009 | Hasek et al. |
| 7,602,820 B2 | 10/2009 | Helms et al. |
| 7,603,529 B1 | 10/2009 | MacHardy et al. |
| 7,627,492 B2 | 12/2009 | Nishizawa et al. |
| 7,634,546 B1 | 12/2009 | Strickholm et al. |
| 7,636,792 B1 | 12/2009 | Ho |
| 7,640,581 B1 | 12/2009 | Brenton et al. |
| 7,647,618 B1 | 1/2010 | Hunter et al. |
| 7,673,004 B1 | 3/2010 | Sherstinsky et al. |
| 7,690,020 B2 | 3/2010 | Lebar |
| 7,693,171 B2 | 4/2010 | Gould |
| 7,694,086 B1 * | 4/2010 | Bezbaruah .......... G06F 11/2071 711/162 |
| 7,707,644 B2 | 4/2010 | Choi et al. |
| 7,712,125 B2 | 5/2010 | Herigstad et al. |
| 7,720,432 B1 | 5/2010 | Colby et al. |
| 7,721,314 B2 | 5/2010 | Sincaglia et al. |
| 7,730,321 B2 | 6/2010 | Gasparini et al. |
| 7,730,509 B2 | 6/2010 | Boulet et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,769,629 B1 | 8/2010 | Kriza et al. |
| 7,783,891 B2 | 8/2010 | Perlin et al. |
| 7,787,416 B2 | 8/2010 | Gidwani |
| 7,793,334 B2 | 9/2010 | Lewis |
| 7,805,515 B2 | 9/2010 | Riley |
| 7,809,942 B2 | 10/2010 | Baran et al. |
| 7,814,119 B2 | 10/2010 | Sato et al. |
| 7,843,876 B2 | 11/2010 | Holt et al. |
| 7,849,491 B2 | 12/2010 | Perlman |
| 7,865,440 B2 | 1/2011 | Jaquette |
| 7,865,475 B1 * | 1/2011 | Yadav .................... G06F 16/128 707/655 |
| 7,870,599 B2 | 1/2011 | Pemmaraju |
| 7,878,908 B2 | 2/2011 | Sloate et al. |
| 7,900,229 B2 | 3/2011 | Dureau |
| 7,908,626 B2 | 3/2011 | Williamson et al. |
| 7,925,592 B1 | 4/2011 | Issa et al. |
| 7,930,558 B2 | 4/2011 | Hori |
| 7,954,131 B2 | 5/2011 | Cholas et al. |
| 7,983,418 B2 | 7/2011 | Oyama et al. |
| 7,984,473 B1 | 7/2011 | Casile et al. |
| 8,006,262 B2 | 8/2011 | Rodriguez et al. |
| 8,006,273 B2 | 8/2011 | Rodriguez |
| 8,015,583 B2 | 9/2011 | Bates et al. |
| 8,024,762 B2 | 9/2011 | Britt |
| 8,028,322 B2 | 9/2011 | Riedl et al. |
| 8,042,131 B2 | 10/2011 | Flickinger |
| 8,055,585 B2 | 11/2011 | Wu |
| 8,065,703 B2 | 11/2011 | Wilson et al. |
| 8,127,331 B2 | 2/2012 | Heilbron et al. |
| 8,150,757 B1 | 4/2012 | Sieffert et al. |
| 8,166,508 B2 | 4/2012 | Mitsuji et al. |
| 8,181,206 B2 | 5/2012 | Hasek |
| 8,181,262 B2 | 5/2012 | Cooper et al. |
| 8,205,226 B2 | 6/2012 | Ko et al. |
| 8,214,256 B2 | 7/2012 | Riedl et al. |
| 8,234,387 B2 | 7/2012 | Bradley et al. |
| 8,250,034 B2 | 8/2012 | Manousos et al. |
| 8,280,982 B2 | 10/2012 | La Joie et al. |
| 8,291,101 B1 | 10/2012 | Yan et al. |
| 8,332,370 B2 | 12/2012 | Gattegno et al. |
| 8,332,657 B1 | 12/2012 | Eskicioglu et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,417,987 B1 * | 4/2013 | Goel .................... G06F 11/1076 714/6.22 |
| 8,424,048 B1 | 4/2013 | Lyren et al. |
| 8,438,243 B2 | 5/2013 | LaJoie et al. |
| 8,472,627 B2 | 6/2013 | Denning et al. |
| 8,520,850 B2 | 8/2013 | Helms et al. |
| 8,527,602 B1 | 9/2013 | Rasmussen et al. |
| 8,561,113 B2 | 10/2013 | Cansler, Jr. et al. |
| 8,583,758 B2 | 11/2013 | Casey et al. |
| 8,584,182 B2 | 11/2013 | Berberet et al. |
| 8,713,623 B2 | 4/2014 | Brooks |
| 8,761,402 B2 | 6/2014 | McAvoy et al. |
| 9,215,423 B2 | 12/2015 | Kimble et al. |
| 9,300,919 B2 | 3/2016 | Cholas et al. |
| 9,317,241 B2 | 4/2016 | Tranchina |
| 9,325,710 B2 | 4/2016 | Lajoie et al. |
| 9,578,288 B2 | 2/2017 | Chen et al. |
| 9,706,160 B2 | 7/2017 | Marsh et al. |
| 9,832,246 B2 | 11/2017 | Lajoie et al. |
| 9,906,838 B2 | 2/2018 | Cronk et al. |
| 2001/0001160 A1 | 5/2001 | Shoff et al. |
| 2001/0003194 A1 | 6/2001 | Shimura et al. |
| 2001/0004768 A1 | 6/2001 | Hodge et al. |
| 2001/0013123 A1 | 8/2001 | Freeman et al. |
| 2001/0013173 A1 | 8/2001 | Mertens et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030975 A1 | 10/2001 | Limb et al. |
| 2001/0037223 A1 | 11/2001 | Beery et al. |
| 2001/0049705 A1 | 12/2001 | Murase et al. |
| 2001/0053223 A1 | 12/2001 | Ishibashi et al. |
| 2001/0053226 A1 | 12/2001 | Akins et al. |
| 2001/0054181 A1 | 12/2001 | Corvin |
| 2001/0056541 A1 | 12/2001 | Matsuzaki et al. |
| 2002/0003789 A1 | 1/2002 | Kim et al. |
| 2002/0004870 A1 | 1/2002 | Kobayashi |
| 2002/0013772 A1 | 1/2002 | Peinado |
| 2002/0013940 A1 | 1/2002 | Tsukamoto et al. |
| 2002/0019984 A1 | 2/2002 | Rakib |
| 2002/0026496 A1 | 2/2002 | Boyer et al. |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0038296 A1 | 3/2002 | Margolus et al. |
| 2002/0042921 A1 | 4/2002 | Ellis |
| 2002/0046286 A1 | 4/2002 | Caldwell et al. |
| 2002/0046406 A1 | 4/2002 | Chelehmal et al. |
| 2002/0046407 A1 | 4/2002 | Franco |
| 2002/0048367 A1 | 4/2002 | Maillard |
| 2002/0049800 A1 | 4/2002 | Kobayashi et al. |

(56) References Cited

U.S. PATENT DOCUMENTS

| | | |
|---|---|---|
| 2002/0049902 A1 | 4/2002 | Rhodes |
| 2002/0054754 A1 | 5/2002 | Kikuchi et al. |
| 2002/0056118 A1 | 5/2002 | Hunter et al. |
| 2002/0056125 A1 | 5/2002 | Hodge et al. |
| 2002/0056175 A1 | 5/2002 | Magarino et al. |
| 2002/0059619 A1 | 5/2002 | Lebar |
| 2002/0059621 A1 | 5/2002 | Thomas et al. |
| 2002/0059635 A1 | 5/2002 | Hoang |
| 2002/0062440 A1 | 5/2002 | Akama |
| 2002/0066033 A1 | 5/2002 | Dobbins et al. |
| 2002/0069404 A1 | 6/2002 | Copeman et al. |
| 2002/0073327 A1 | 6/2002 | Vellandi |
| 2002/0073419 A1 | 6/2002 | Yen et al. |
| 2002/0077984 A1 | 6/2002 | Ireton |
| 2002/0078176 A1 | 6/2002 | Nomura et al. |
| 2002/0078441 A1 | 6/2002 | Drake et al. |
| 2002/0078444 A1 | 6/2002 | Krewin et al. |
| 2002/0082858 A1 | 6/2002 | Heddaya et al. |
| 2002/0083456 A1 | 6/2002 | Bates et al. |
| 2002/0085516 A1 | 7/2002 | Bridgelall |
| 2002/0087661 A1 | 7/2002 | Matichuk et al. |
| 2002/0087975 A1 | 7/2002 | Schlack |
| 2002/0087976 A1 | 7/2002 | Kaplan et al. |
| 2002/0099642 A1 | 7/2002 | Schwankl et al. |
| 2002/0100055 A1 | 7/2002 | Zeidman |
| 2002/0100063 A1 | 7/2002 | Herigstad et al. |
| 2002/0104019 A1 | 8/2002 | Chatani et al. |
| 2002/0104083 A1 | 8/2002 | Hendricks et al. |
| 2002/0104099 A1 | 8/2002 | Novak |
| 2002/0112186 A1 | 8/2002 | Ford et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0126654 A1 | 9/2002 | Preston et al. |
| 2002/0129358 A1 | 9/2002 | Buehl et al. |
| 2002/0138854 A1 | 9/2002 | Desai et al. |
| 2002/0143565 A1 | 10/2002 | Headings et al. |
| 2002/0144067 A1 | 10/2002 | Jeong |
| 2002/0144262 A1 | 10/2002 | Plotnick et al. |
| 2002/0144263 A1 | 10/2002 | Eldering et al. |
| 2002/0147771 A1 | 10/2002 | Traversat et al. |
| 2002/0147984 A1 | 10/2002 | Tomsen et al. |
| 2002/0151271 A1 | 10/2002 | Tatsuji et al. |
| 2002/0152299 A1 | 10/2002 | Traversat et al. |
| 2002/0152318 A1 | 10/2002 | Menon et al. |
| 2002/0152393 A1 | 10/2002 | Thoma et al. |
| 2002/0152458 A1 | 10/2002 | Eyer et al. |
| 2002/0166119 A1 | 11/2002 | Cristofalo |
| 2002/0166121 A1 | 11/2002 | Rovira |
| 2002/0169961 A1 | 11/2002 | Giles et al. |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0183985 A1 | 12/2002 | Hori et al. |
| 2002/0184154 A1 | 12/2002 | Hori et al. |
| 2002/0184239 A1* | 12/2002 | Mosher, Jr. ......... G06F 11/1474 |
| 2002/0184629 A1 | 12/2002 | Sie et al. |
| 2002/0184634 A1 | 12/2002 | Cooper |
| 2002/0184635 A1 | 12/2002 | Istvan |
| 2002/0188689 A1 | 12/2002 | Michael |
| 2002/0188744 A1 | 12/2002 | Mani |
| 2002/0188869 A1 | 12/2002 | Patrick |
| 2002/0191950 A1 | 12/2002 | Wang |
| 2002/0194498 A1 | 12/2002 | Blight et al. |
| 2002/0196940 A1 | 12/2002 | Isaacson et al. |
| 2002/0199105 A1 | 12/2002 | Ishiguro et al. |
| 2003/0004810 A1 | 1/2003 | Eldering |
| 2003/0005446 A1 | 1/2003 | Jaff et al. |
| 2003/0005447 A1 | 1/2003 | Rodriguez |
| 2003/0005453 A1 | 1/2003 | Rodriguez et al. |
| 2003/0009681 A1 | 1/2003 | Harada et al. |
| 2003/0018977 A1 | 1/2003 | McKenna |
| 2003/0020744 A1 | 1/2003 | Ellis et al. |
| 2003/0021421 A1 | 1/2003 | Yokota et al. |
| 2003/0022990 A1 | 1/2003 | Hirota et al. |
| 2003/0023690 A1 | 1/2003 | Lohtia |
| 2003/0028893 A1 | 2/2003 | H. Addington et al. |
| 2003/0030751 A1 | 2/2003 | Lupulescu et al. |
| 2003/0033199 A1 | 2/2003 | Coleman |
| 2003/0037330 A1 | 2/2003 | Makofka |
| 2003/0037335 A1 | 2/2003 | Gatto et al. |
| 2003/0037338 A1 | 2/2003 | Suzuki |
| 2003/0041336 A1 | 2/2003 | Del et al. |
| 2003/0046560 A1 | 3/2003 | Inomata et al. |
| 2003/0046689 A1 | 3/2003 | Gaos |
| 2003/0048380 A1 | 3/2003 | Tamura |
| 2003/0049021 A1 | 3/2003 | Kamieniecki |
| 2003/0053476 A1 | 3/2003 | Sorenson et al. |
| 2003/0056217 A1 | 3/2003 | Brooks |
| 2003/0058887 A1 | 3/2003 | Dworkin et al. |
| 2003/0069965 A1 | 4/2003 | Ma et al. |
| 2003/0070052 A1 | 4/2003 | Lai |
| 2003/0074571 A1 | 4/2003 | Fujiwara et al. |
| 2003/0074661 A1 | 4/2003 | Krapf et al. |
| 2003/0084003 A1 | 5/2003 | Pinkas et al. |
| 2003/0093311 A1 | 5/2003 | Knowlson |
| 2003/0093515 A1 | 5/2003 | Kauffman |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0093806 A1 | 5/2003 | Dureau et al. |
| 2003/0097340 A1 | 5/2003 | Okamoto et al. |
| 2003/0097574 A1 | 5/2003 | Upton |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115267 A1 | 6/2003 | Hinton et al. |
| 2003/0115601 A1 | 6/2003 | Palazzo et al. |
| 2003/0118014 A1 | 6/2003 | Iyer et al. |
| 2003/0130008 A1 | 7/2003 | Rajaniemi et al. |
| 2003/0135513 A1 | 7/2003 | Quinn et al. |
| 2003/0135628 A1 | 7/2003 | Fletcher et al. |
| 2003/0140227 A1 | 7/2003 | Asano et al. |
| 2003/0143984 A1 | 7/2003 | Umeda |
| 2003/0145323 A1 | 7/2003 | Hendricks et al. |
| 2003/0149884 A1 | 8/2003 | Hernandez et al. |
| 2003/0149975 A1 | 8/2003 | Eldering et al. |
| 2003/0149988 A1 | 8/2003 | Ellis et al. |
| 2003/0149990 A1 | 8/2003 | Anttila et al. |
| 2003/0149993 A1 | 8/2003 | Son et al. |
| 2003/0151621 A1 | 8/2003 | McEvilly et al. |
| 2003/0163697 A1 | 8/2003 | Pabla et al. |
| 2003/0163739 A1 | 8/2003 | Armington et al. |
| 2003/0163832 A1 | 8/2003 | Tsuria et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0177490 A1 | 9/2003 | Hoshino et al. |
| 2003/0182551 A1 | 9/2003 | Frantz et al. |
| 2003/0187799 A1 | 10/2003 | Sellars et al. |
| 2003/0188023 A1 | 10/2003 | Grecco et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0208768 A1 | 11/2003 | Urdang et al. |
| 2003/0217137 A1 | 11/2003 | Roese et al. |
| 2003/0217365 A1 | 11/2003 | Caputo |
| 2003/0223450 A1 | 12/2003 | Bender et al. |
| 2003/0225777 A1 | 12/2003 | Marsh |
| 2003/0226150 A1 | 12/2003 | Berberet et al. |
| 2003/0229898 A1 | 12/2003 | Babu et al. |
| 2003/0229900 A1 | 12/2003 | Reisman |
| 2003/0231661 A1 | 12/2003 | Depietro et al. |
| 2003/0236839 A1 | 12/2003 | Demsky et al. |
| 2003/0237090 A1 | 12/2003 | Boston et al. |
| 2004/0006694 A1 | 1/2004 | Heelan et al. |
| 2004/0015608 A1 | 1/2004 | Ellis et al. |
| 2004/0015989 A1 | 1/2004 | Kaizu et al. |
| 2004/0019569 A1 | 1/2004 | Lee et al. |
| 2004/0024688 A1 | 2/2004 | Bi et al. |
| 2004/0025181 A1 | 2/2004 | Addington et al. |

(56) References Cited

U.S. PATENT DOCUMENTS

| | | |
|---|---|---|
| 2004/0025190 A1 | 2/2004 | McCalla et al. |
| 2004/0034873 A1 | 2/2004 | Zenoni |
| 2004/0034877 A1 | 2/2004 | Nogues |
| 2004/0039911 A1 | 2/2004 | Oka et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0047599 A1 | 3/2004 | Grzeczkowski |
| 2004/0049694 A1 | 3/2004 | Candelore |
| 2004/0052377 A1 | 3/2004 | Mattox et al. |
| 2004/0060076 A1 | 3/2004 | Song |
| 2004/0073915 A1 | 4/2004 | Dureau |
| 2004/0078371 A1 | 4/2004 | Worrall et al. |
| 2004/0078602 A1 | 4/2004 | Rothbarth et al. |
| 2004/0078809 A1 | 4/2004 | Drazin |
| 2004/0088558 A1 | 5/2004 | Candelore |
| 2004/0093394 A1 | 5/2004 | Weber et al. |
| 2004/0103120 A1 | 5/2004 | Fickle et al. |
| 2004/0103429 A1 | 5/2004 | Carlucci et al. |
| 2004/0103479 A1 | 6/2004 | Mossbeck et al. |
| 2004/0104842 A1 | 6/2004 | Drury et al. |
| 2004/0114539 A1 | 6/2004 | Beshai et al. |
| 2004/0117817 A1 | 6/2004 | Kwon et al. |
| 2004/0117836 A1 | 6/2004 | Karaoguz et al. |
| 2004/0117846 A1 | 6/2004 | Karaoguz et al. |
| 2004/0123125 A1 | 6/2004 | Zuili |
| 2004/0123129 A1 | 6/2004 | Ginter et al. |
| 2004/0128499 A1 | 7/2004 | Peterka et al. |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0153525 A1 | 8/2004 | Borella |
| 2004/0163111 A1 | 8/2004 | Palazzo et al. |
| 2004/0163129 A1 | 8/2004 | Chapman et al. |
| 2004/0172531 A1 | 9/2004 | Little et al. |
| 2004/0177369 A1 | 9/2004 | Akins |
| 2004/0177383 A1 | 9/2004 | Martinolich et al. |
| 2004/0181800 A1 | 9/2004 | Rakib et al. |
| 2004/0181811 A1 | 9/2004 | Rakib |
| 2004/0184616 A1 | 9/2004 | Morten |
| 2004/0185856 A1 | 9/2004 | McKenna et al. |
| 2004/0190714 A1 | 9/2004 | Masui et al. |
| 2004/0190721 A1 | 9/2004 | Barrett et al. |
| 2004/0193609 A1 | 9/2004 | Phan et al. |
| 2004/0193680 A1 | 9/2004 | Gibbs et al. |
| 2004/0193712 A1 | 9/2004 | Benenati et al. |
| 2004/0198386 A1 | 10/2004 | Dupray |
| 2004/0221305 A1 | 11/2004 | Broussard et al. |
| 2004/0224425 A1 | 11/2004 | Gjerde et al. |
| 2004/0228607 A1* | 11/2004 | Tsutsumitake ....... G11B 27/105 348/E7.071 |
| 2004/0237100 A1 | 11/2004 | Pinder et al. |
| 2004/0246933 A1 | 12/2004 | Valko et al. |
| 2004/0250273 A1 | 12/2004 | Swix et al. |
| 2004/0255139 A1 | 12/2004 | Giobbi |
| 2004/0255335 A1 | 12/2004 | Fickle et al. |
| 2004/0260798 A1 | 12/2004 | Addington et al. |
| 2004/0261096 A1 | 12/2004 | Matz et al. |
| 2004/0261099 A1 | 12/2004 | Durden et al. |
| 2004/0264511 A1 | 12/2004 | Futch et al. |
| 2004/0264551 A1 | 12/2004 | Eidson |
| 2004/0266336 A1 | 12/2004 | Patsiokas et al. |
| 2004/0268386 A1 | 12/2004 | Logan et al. |
| 2005/0005287 A1 | 1/2005 | Claussen |
| 2005/0015810 A1 | 1/2005 | Gould et al. |
| 2005/0021940 A1 | 1/2005 | Ma |
| 2005/0021985 A1 | 1/2005 | Ono et al. |
| 2005/0022227 A1 | 1/2005 | Shen et al. |
| 2005/0022237 A1 | 1/2005 | Nomura |
| 2005/0022242 A1 | 1/2005 | Rosetti et al. |
| 2005/0022247 A1 | 1/2005 | Bitran et al. |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0038904 A1 | 2/2005 | Dougall |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0071882 A1 | 3/2005 | Rodriguez et al. |
| 2005/0080330 A1 | 4/2005 | Masuzawa et al. |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0091539 A1 | 4/2005 | Wang et al. |
| 2005/0091681 A1 | 4/2005 | Borden et al. |
| 2005/0097006 A1 | 5/2005 | Nyako |
| 2005/0102529 A1 | 5/2005 | Buddhikot et al. |
| 2005/0105396 A1 | 5/2005 | Schybergson |
| 2005/0108529 A1 | 5/2005 | Juneau |
| 2005/0108763 A1 | 5/2005 | Baran et al. |
| 2005/0111467 A1 | 5/2005 | Ng et al. |
| 2005/0114686 A1 | 5/2005 | Ball et al. |
| 2005/0114900 A1 | 5/2005 | Ladd et al. |
| 2005/0138357 A1 | 6/2005 | Swenson et al. |
| 2005/0144333 A1 | 6/2005 | Kotzin |
| 2005/0144635 A1 | 6/2005 | Boortz et al. |
| 2005/0153778 A1 | 7/2005 | Nelson et al. |
| 2005/0166224 A1 | 7/2005 | Ficco |
| 2005/0169468 A1 | 8/2005 | Fahrny et al. |
| 2005/0172127 A1 | 8/2005 | Hartung et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0179938 A1 | 8/2005 | Kayashima et al. |
| 2005/0182931 A1 | 8/2005 | Robert et al. |
| 2005/0183120 A1 | 8/2005 | Jain et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0204019 A1 | 9/2005 | Flynn et al. |
| 2005/0210500 A1 | 9/2005 | Stone |
| 2005/0210502 A1 | 9/2005 | Flickinger et al. |
| 2005/0216524 A1* | 9/2005 | Gomes ................. G06F 16/273 |
| 2005/0216942 A1 | 9/2005 | Barton |
| 2005/0223032 A1 | 10/2005 | Shan et al. |
| 2005/0223409 A1 | 10/2005 | Rautila et al. |
| 2005/0229209 A1 | 10/2005 | Hildebolt et al. |
| 2005/0229213 A1 | 10/2005 | Ellis et al. |
| 2005/0233776 A1 | 10/2005 | Allen et al. |
| 2005/0235318 A1 | 10/2005 | Grauch et al. |
| 2005/0239402 A1 | 10/2005 | Gioscia et al. |
| 2005/0251454 A1 | 11/2005 | Wood |
| 2005/0261970 A1 | 11/2005 | Vucina et al. |
| 2005/0262418 A1 | 11/2005 | Gehrmann |
| 2005/0262542 A1 | 11/2005 | DeWeese et al. |
| 2005/0267787 A1 | 12/2005 | Rose et al. |
| 2005/0267916 A1* | 12/2005 | Tone ................. G06F 11/2048 |
| 2005/0268107 A1 | 12/2005 | Harris et al. |
| 2005/0273629 A1 | 12/2005 | Abrams et al. |
| 2005/0273819 A1 | 12/2005 | Knudson et al. |
| 2005/0273828 A1 | 12/2005 | Barton |
| 2005/0278259 A1 | 12/2005 | Gunaseelan et al. |
| 2005/0278741 A1 | 12/2005 | Robarts et al. |
| 2005/0278760 A1 | 12/2005 | Dewar et al. |
| 2005/0289588 A1 | 12/2005 | Kinnear |
| 2005/0289618 A1 | 12/2005 | Hardin |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0010226 A1 | 1/2006 | Hurtta et al. |
| 2006/0013557 A1 | 1/2006 | Poslinski |
| 2006/0015352 A1 | 1/2006 | Wynn et al. |
| 2006/0015580 A1 | 1/2006 | Gabriel et al. |
| 2006/0015925 A1 | 1/2006 | Logan |
| 2006/0019702 A1 | 1/2006 | Anttila et al. |
| 2006/0020786 A1 | 1/2006 | Helms et al. |
| 2006/0020950 A1 | 1/2006 | Ladd et al. |

(56) References Cited

U.S. PATENT DOCUMENTS

| | | |
|---|---|---|
| 2006/0021004 A1 | 1/2006 | Moran et al. |
| 2006/0021019 A1 | 1/2006 | Hinton et al. |
| 2006/0031558 A1 | 2/2006 | Ortega et al. |
| 2006/0031883 A1 | 2/2006 | Ellis et al. |
| 2006/0031892 A1 | 2/2006 | Cohen |
| 2006/0036750 A1 | 2/2006 | Ladd et al. |
| 2006/0041903 A1 | 2/2006 | Kahn et al. |
| 2006/0041905 A1 | 2/2006 | Wasilewski |
| 2006/0041910 A1 | 2/2006 | Hatanaka et al. |
| 2006/0047603 A1 | 3/2006 | Fontijn |
| 2006/0047745 A1 | 3/2006 | Knowles et al. |
| 2006/0047801 A1 | 3/2006 | Haag et al. |
| 2006/0047957 A1 | 3/2006 | Helms et al. |
| 2006/0053473 A1 | 3/2006 | Vau et al. |
| 2006/0064583 A1 | 3/2006 | Birnbaum et al. |
| 2006/0075230 A1 | 4/2006 | Baird, III et al. |
| 2006/0080408 A1 | 4/2006 | Istvan et al. |
| 2006/0088063 A1 | 4/2006 | Hartung et al. |
| 2006/0089911 A1 | 4/2006 | Dandekar et al. |
| 2006/0095940 A1 | 5/2006 | Yearwood |
| 2006/0107302 A1 | 5/2006 | Zdepski |
| 2006/0116966 A1 | 6/2006 | Pedersen et al. |
| 2006/0117341 A1 | 6/2006 | Park |
| 2006/0117365 A1 | 6/2006 | Ueda et al. |
| 2006/0117366 A1 | 6/2006 | Fries |
| 2006/0123147 A1 | 6/2006 | Yasuhara |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0130120 A1 | 6/2006 | Brandyberry et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0153017 A1 | 7/2006 | Kim |
| 2006/0159048 A1 | 7/2006 | Han et al. |
| 2006/0161635 A1 | 7/2006 | Lamkin et al. |
| 2006/0163340 A1 | 7/2006 | Leiper |
| 2006/0167808 A1 | 7/2006 | Greene et al. |
| 2006/0168219 A1 | 7/2006 | Ahluwalia et al. |
| 2006/0168616 A1 | 7/2006 | Candelore |
| 2006/0171390 A1 | 8/2006 | La |
| 2006/0171423 A1 | 8/2006 | Helms et al. |
| 2006/0173787 A1 | 8/2006 | Weber et al. |
| 2006/0176884 A1 | 8/2006 | Fair et al. |
| 2006/0179138 A1 | 8/2006 | Van Gassel et al. |
| 2006/0184972 A1 | 8/2006 | Rafey et al. |
| 2006/0185004 A1 | 8/2006 | Song et al. |
| 2006/0187900 A1 | 8/2006 | Akbar |
| 2006/0190336 A1 | 8/2006 | Pisaris-Henderson et al. |
| 2006/0195553 A1 | 8/2006 | Nakamura |
| 2006/0200559 A1 | 9/2006 | Ling et al. |
| 2006/0200761 A1 | 9/2006 | Judd et al. |
| 2006/0200856 A1 | 9/2006 | Salowey et al. |
| 2006/0200865 A1 | 9/2006 | Leake et al. |
| 2006/0206565 A1 | 9/2006 | Ganesan et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0212435 A1 | 9/2006 | Williams et al. |
| 2006/0218604 A1 | 9/2006 | Riedl et al. |
| 2006/0218647 A1 | 9/2006 | Hars et al. |
| 2006/0222321 A1 | 10/2006 | Russ |
| 2006/0236131 A1 | 10/2006 | Vauclair |
| 2006/0242267 A1 | 10/2006 | Grossman |
| 2006/0248209 A1 | 11/2006 | Chiu et al. |
| 2006/0248355 A1 | 11/2006 | Thayer |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253545 A1 | 11/2006 | Lakamp |
| 2006/0253584 A1 | 11/2006 | Dixon et al. |
| 2006/0253864 A1 | 11/2006 | Easty |
| 2006/0253894 A1 | 11/2006 | Bookman et al. |
| 2006/0256814 A1 | 11/2006 | Caci |
| 2006/0259924 A1 | 11/2006 | Boortz et al. |
| 2006/0259927 A1 | 11/2006 | Acharya et al. |
| 2006/0272032 A1 | 11/2006 | Jogand-Coulomb et al. |
| 2006/0277569 A1 | 12/2006 | Smith |
| 2006/0277576 A1 | 12/2006 | Acharya et al. |
| 2006/0282319 A1 | 12/2006 | Maggio |
| 2006/0291506 A1 | 12/2006 | Cain |
| 2006/0291507 A1 | 12/2006 | Sarosi et al. |
| 2006/0293954 A1 | 12/2006 | Anderson et al. |
| 2006/0294259 A1 | 12/2006 | Matefi et al. |
| 2006/0294371 A1 | 12/2006 | Fanning |
| 2007/0011335 A1 | 1/2007 | Burns et al. |
| 2007/0019645 A1 | 1/2007 | Menon |
| 2007/0022032 A1 | 1/2007 | Anderson et al. |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0038931 A1 | 2/2007 | Allaire et al. |
| 2007/0046791 A1 | 3/2007 | Wang et al. |
| 2007/0049245 A1 | 3/2007 | Lipman |
| 2007/0061331 A1 | 3/2007 | Ramer et al. |
| 2007/0061336 A1 | 3/2007 | Ramer et al. |
| 2007/0067851 A1 | 3/2007 | Fernando et al. |
| 2007/0076728 A1 | 4/2007 | Rieger et al. |
| 2007/0077921 A1 | 4/2007 | Hayashi et al. |
| 2007/0078714 A1 | 4/2007 | Ott, IV et al. |
| 2007/0079381 A1 | 4/2007 | Hartung et al. |
| 2007/0083899 A1 | 4/2007 | Compton et al. |
| 2007/0086372 A1 | 4/2007 | Lee et al. |
| 2007/0088801 A1 | 4/2007 | Levkovitz et al. |
| 2007/0088832 A1 | 4/2007 | Tsang et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0101359 A1 | 5/2007 | Schiller et al. |
| 2007/0104456 A1 | 5/2007 | Craner |
| 2007/0106814 A1 | 5/2007 | Son et al. |
| 2007/0107035 A1 | 5/2007 | Howe et al. |
| 2007/0112685 A1 | 5/2007 | Yamamichi |
| 2007/0113243 A1 | 5/2007 | Brey |
| 2007/0115389 A1 | 5/2007 | McCarthy et al. |
| 2007/0118857 A1 | 5/2007 | Chen et al. |
| 2007/0121612 A1 | 5/2007 | Nadeau et al. |
| 2007/0121678 A1 | 5/2007 | Brooks et al. |
| 2007/0123253 A1 | 5/2007 | Simongini et al. |
| 2007/0124416 A1 | 5/2007 | Casey et al. |
| 2007/0124488 A1 | 5/2007 | Baum et al. |
| 2007/0124602 A1 | 5/2007 | Wald et al. |
| 2007/0124781 A1 | 5/2007 | Casey et al. |
| 2007/0129987 A1 | 6/2007 | Hauser et al. |
| 2007/0136743 A1 | 6/2007 | Hasek et al. |
| 2007/0136777 A1 | 6/2007 | Hasek et al. |
| 2007/0150919 A1 | 6/2007 | Morishita et al. |
| 2007/0157249 A1 | 7/2007 | Cordray et al. |
| 2007/0157260 A1 | 7/2007 | Walker |
| 2007/0157295 A1 | 7/2007 | Mangalore et al. |
| 2007/0162958 A1 | 7/2007 | Kao et al. |
| 2007/0166687 A1 | 7/2007 | Bell et al. |
| 2007/0168429 A1 | 7/2007 | Apfel et al. |
| 2007/0171274 A1 | 7/2007 | Yim |
| 2007/0174888 A1 | 7/2007 | Rubinstein |
| 2007/0186103 A1 | 8/2007 | Randle et al. |
| 2007/0192615 A1 | 8/2007 | Varghese et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0206799 A1 | 9/2007 | Wingert et al. |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0220158 A1 | 9/2007 | Tolgu et al. |
| 2007/0220573 A1 | 9/2007 | Chiussi et al. |
| 2007/0220605 A1 | 9/2007 | Chien |
| 2007/0233857 A1 | 10/2007 | Cheng et al. |
| 2007/0237330 A1 | 10/2007 | Srivastava |

(56) References Cited

U.S. PATENT DOCUMENTS

| | | |
|---|---|---|
| 2007/0244760 A1 | 10/2007 | Bodnar et al. |
| 2007/0247395 A1 | 10/2007 | Barraclough et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0265978 A1 | 11/2007 | Kahn et al. |
| 2007/0271388 A1 | 11/2007 | Bowra et al. |
| 2007/0276864 A1 | 11/2007 | Espelien |
| 2007/0276925 A1* | 11/2007 | La Joie ............ H04N 21/835 709/219 |
| 2007/0276926 A1 | 11/2007 | LaJoie et al. |
| 2007/0279625 A1 | 12/2007 | Rzasa et al. |
| 2007/0280110 A1 | 12/2007 | Murphy et al. |
| 2007/0294178 A1 | 12/2007 | Pinder et al. |
| 2007/0294720 A1 | 12/2007 | Cohen et al. |
| 2008/0008321 A1 | 1/2008 | Gagnon et al. |
| 2008/0008371 A1 | 1/2008 | Woods et al. |
| 2008/0009268 A1 | 1/2008 | Ramer et al. |
| 2008/0021836 A1 | 1/2008 | Lao |
| 2008/0022012 A1 | 1/2008 | Wang |
| 2008/0040758 A1 | 2/2008 | Beetcher et al. |
| 2008/0046400 A1* | 2/2008 | Shi .................. H04L 67/1001 707/E17.046 |
| 2008/0052157 A1 | 2/2008 | Kadambi et al. |
| 2008/0059409 A1 | 3/2008 | Montpetit |
| 2008/0059804 A1 | 3/2008 | Shah et al. |
| 2008/0066112 A1 | 3/2008 | Bailey et al. |
| 2008/0072249 A1 | 3/2008 | Hovnanian et al. |
| 2008/0090513 A1 | 4/2008 | Collins et al. |
| 2008/0091805 A1 | 4/2008 | Malaby et al. |
| 2008/0091807 A1 | 4/2008 | Strub et al. |
| 2008/0092181 A1 | 4/2008 | Britt |
| 2008/0098212 A1 | 4/2008 | Helms et al. |
| 2008/0098422 A1 | 4/2008 | Rodriguez et al. |
| 2008/0103976 A1 | 5/2008 | Read et al. |
| 2008/0103977 A1 | 5/2008 | Khosravy et al. |
| 2008/0112405 A1 | 5/2008 | Cholas et al. |
| 2008/0115161 A1 | 5/2008 | Kurzion |
| 2008/0115169 A1 | 5/2008 | Ellis et al. |
| 2008/0117920 A1 | 5/2008 | Tucker |
| 2008/0123862 A1 | 5/2008 | Rowley |
| 2008/0130812 A1* | 6/2008 | Eom .................. G06F 16/25 375/359 |
| 2008/0133551 A1 | 6/2008 | Wensley et al. |
| 2008/0139193 A1 | 6/2008 | Hao et al. |
| 2008/0141353 A1 | 6/2008 | Brown |
| 2008/0147497 A1 | 6/2008 | Tischer |
| 2008/0148362 A1 | 6/2008 | Gilder et al. |
| 2008/0154626 A1 | 6/2008 | Gounares et al. |
| 2008/0155059 A1 | 6/2008 | Hardin et al. |
| 2008/0155589 A1 | 6/2008 | McKinnon et al. |
| 2008/0155600 A1 | 6/2008 | Klappert et al. |
| 2008/0155607 A1 | 6/2008 | Klappert |
| 2008/0155616 A1 | 6/2008 | Logan et al. |
| 2008/0162353 A1 | 7/2008 | Tom et al. |
| 2008/0163305 A1 | 7/2008 | Johnson et al. |
| 2008/0165460 A1 | 7/2008 | Whitby-Strevens |
| 2008/0171423 A1 | 7/2008 | Ieong et al. |
| 2008/0177998 A1 | 7/2008 | Apsangi et al. |
| 2008/0192820 A1 | 8/2008 | Brooks et al. |
| 2008/0195871 A1 | 8/2008 | Peinado et al. |
| 2008/0196056 A1 | 8/2008 | Bassett et al. |
| 2008/0209464 A1 | 8/2008 | Wright-Riley |
| 2008/0212945 A1 | 9/2008 | Khedouri et al. |
| 2008/0216106 A1 | 9/2008 | Maxwell et al. |
| 2008/0221986 A1 | 9/2008 | Soicher et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0256510 A1 | 10/2008 | Auerbach |
| 2008/0263578 A1 | 10/2008 | Bayer et al. |
| 2008/0270307 A1 | 10/2008 | Olson et al. |
| 2008/0271068 A1 | 10/2008 | Ou et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2008/0289009 A1 | 11/2008 | Lee et al. |
| 2008/0313671 A1 | 12/2008 | Batrouny et al. |
| 2008/0313691 A1 | 12/2008 | Cholas et al. |
| 2009/0007234 A1 | 1/2009 | Birger et al. |
| 2009/0019134 A1 | 1/2009 | Bellifemine et al. |
| 2009/0019492 A1 | 1/2009 | Grasset |
| 2009/0025075 A1 | 1/2009 | Chow et al. |
| 2009/0030802 A1 | 1/2009 | Plotnick et al. |
| 2009/0031371 A1 | 1/2009 | Munsell et al. |
| 2009/0034521 A1 | 2/2009 | Kato |
| 2009/0083813 A1 | 3/2009 | Dolce et al. |
| 2009/0094652 A1 | 4/2009 | Al Adham et al. |
| 2009/0098861 A1 | 4/2009 | Kalliola et al. |
| 2009/0100147 A1 | 4/2009 | Igarashi |
| 2009/0100459 A1 | 4/2009 | Riedl et al. |
| 2009/0102983 A1 | 4/2009 | Malone et al. |
| 2009/0132346 A1 | 5/2009 | Duggal et al. |
| 2009/0138922 A1 | 5/2009 | Thomas et al. |
| 2009/0151006 A1 | 6/2009 | Saeki et al. |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0198794 A1 | 8/2009 | Beals |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0220216 A1 | 9/2009 | Marsh et al. |
| 2009/0225760 A1 | 9/2009 | Foti |
| 2009/0235319 A1 | 9/2009 | Mao et al. |
| 2009/0248794 A1 | 10/2009 | Helms et al. |
| 2009/0249473 A1 | 10/2009 | Cohn |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0290711 A1 | 11/2009 | Bloom et al. |
| 2009/0292922 A1 | 11/2009 | Park |
| 2009/0293101 A1 | 11/2009 | Carter et al. |
| 2009/0317065 A1 | 12/2009 | Fyock et al. |
| 2009/0319379 A1 | 12/2009 | Joao |
| 2009/0320059 A1 | 12/2009 | Bolyukh |
| 2010/0017627 A1 | 1/2010 | Princen et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0082983 A1 | 4/2010 | Shah et al. |
| 2010/0083329 A1 | 4/2010 | Joyce et al. |
| 2010/0083362 A1 | 4/2010 | Francisco et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0107194 A1 | 4/2010 | McKissick et al. |
| 2010/0131973 A1 | 5/2010 | Dillon et al. |
| 2010/0138900 A1 | 6/2010 | Peterka et al. |
| 2010/0146539 A1 | 6/2010 | Hicks, III et al. |
| 2010/0169977 A1 | 7/2010 | Dasher et al. |
| 2010/0175584 A1 | 7/2010 | Kusaka et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251304 A1 | 9/2010 | Donoghue et al. |
| 2010/0251305 A1 | 9/2010 | Kimble et al. |
| 2010/0251312 A1 | 9/2010 | Albano et al. |
| 2010/0287584 A1 | 11/2010 | Starikov et al. |
| 2010/0287609 A1 | 11/2010 | Gonzalez et al. |
| 2010/0306369 A1 | 12/2010 | Riley |
| 2010/0310076 A1 | 12/2010 | Barzilai et al. |
| 2010/0313225 A1 | 12/2010 | Cholas et al. |
| 2010/0313226 A1 | 12/2010 | Cholas et al. |
| 2010/0318634 A1* | 12/2010 | Chen .................. H04L 51/066 709/219 |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0040755 A1 | 2/2011 | Hindle et al. |
| 2011/0041146 A1 | 2/2011 | Lewis |
| 2011/0055347 A1 | 3/2011 | Hu et al. |
| 2011/0071841 A1 | 3/2011 | Fomenko et al. |
| 2011/0078721 A1 | 3/2011 | Wang et al. |

(56) References Cited

U.S. PATENT DOCUMENTS

| | | |
|---|---|---|
| 2011/0093900 A1 | 4/2011 | Patel et al. |
| 2011/0099593 A1 | 4/2011 | Kim et al. |
| 2011/0103374 A1 | 5/2011 | Lajoie et al. |
| 2011/0107379 A1 | 5/2011 | Lajoie et al. |
| 2011/0164753 A1 | 7/2011 | Dubhashi et al. |
| 2011/0169977 A1 | 7/2011 | Masuda |
| 2011/0179096 A1 | 7/2011 | Galloway et al. |
| 2011/0197070 A1 | 8/2011 | Mizrah |
| 2011/0206200 A1 | 8/2011 | Sovio et al. |
| 2011/0213688 A1 | 9/2011 | Santos et al. |
| 2011/0219229 A1 | 9/2011 | Cholas et al. |
| 2011/0225417 A1* | 9/2011 | Maharajh ............ H04L 65/752 713/150 |
| 2011/0252236 A1 | 10/2011 | De Atley et al. |
| 2011/0252243 A1 | 10/2011 | Brouwer et al. |
| 2011/0307795 A1* | 12/2011 | Guillou ................ G06F 3/0608 715/738 |
| 2012/0005756 A1 | 1/2012 | Hoefelmeyer et al. |
| 2012/0008786 A1 | 1/2012 | Cronk et al. |
| 2012/0011567 A1 | 1/2012 | Cronk et al. |
| 2012/0030714 A1 | 2/2012 | Sweatt, III et al. |
| 2012/0089699 A1 | 4/2012 | Cholas |
| 2012/0131629 A1 | 5/2012 | Shrum, Jr. et al. |
| 2012/0158547 A1 | 6/2012 | Wood et al. |
| 2012/0159603 A1 | 6/2012 | Queck |
| 2012/0167173 A1 | 6/2012 | Nadalin et al. |
| 2012/0210382 A1* | 8/2012 | Walker ................ H04N 21/218 725/115 |
| 2012/0260346 A1 | 10/2012 | Carey et al. |
| 2012/0278831 A1* | 11/2012 | van Coppenolle ... H04L 65/612 725/25 |
| 2012/0284765 A1 | 11/2012 | Killick et al. |
| 2012/0291062 A1 | 11/2012 | Pearson et al. |
| 2012/0291140 A1 | 11/2012 | Robert et al. |
| 2013/0031643 A1* | 1/2013 | Rogel .................... H04L 67/10 726/29 |
| 2013/0036011 A1 | 2/2013 | Roberts et al. |
| 2013/0120570 A1 | 5/2013 | Stanley et al. |
| 2013/0191443 A1 | 7/2013 | Gan et al. |
| 2013/0219458 A1 | 8/2013 | Ramanathan |
| 2013/0227608 A1 | 8/2013 | Evans et al. |
| 2013/0239134 A1 | 9/2013 | Lajoie et al. |
| 2013/0239135 A1 | 9/2013 | Parker et al. |
| 2013/0243404 A1* | 9/2013 | Rose .................. H04N 21/4325 386/297 |
| 2013/0309971 A1 | 11/2013 | Kiukkonen et al. |
| 2013/0318629 A1 | 11/2013 | Lajoie et al. |
| 2013/0347089 A1 | 12/2013 | Bailey et al. |
| 2014/0006685 A1* | 1/2014 | Peterson ............ G06F 12/0238 711/102 |
| 2014/0173675 A1* | 6/2014 | Ahmed .................. H04L 67/02 725/116 |
| 2014/0233923 A1 | 8/2014 | Bradley et al. |
| 2014/0281489 A1 | 9/2014 | Peterka et al. |
| 2014/0282750 A1 | 9/2014 | Civiletto |
| 2014/0282786 A1* | 9/2014 | Lajoie ................ H04L 63/0428 725/115 |
| 2014/0283137 A1 | 9/2014 | Rebaud et al. |
| 2015/0193602 A1* | 7/2015 | Rogel .................... H04L 67/10 726/29 |
| 2015/0348129 A1 | 12/2015 | Inoue et al. |
| 2015/0365491 A1* | 12/2015 | Chan .................. H04N 21/4335 709/219 |
| 2016/0050190 A1 | 2/2016 | Mooij et al. |
| 2016/0165650 A1 | 6/2016 | Kim et al. |
| 2016/0165651 A1 | 6/2016 | Pathuri et al. |
| 2016/0301525 A1 | 10/2016 | Canard et al. |
| 2017/0124342 A1* | 5/2017 | Panchapakesan .. H04N 21/2541 |
| 2019/0354540 A1* | 11/2019 | Stigsen ................ G06F 7/14 |
| 2020/0202465 A1* | 6/2020 | Massover ........... G06F 21/6272 |

FOREIGN PATENT DOCUMENTS

| | | | |
|---|---|---|---|
| CA | 2438497 C | 11/2013 | |
| CN | 102158759 A * | 8/2011 | |
| EP | 1134951 A2 | 9/2001 | |
| EP | 1139198 A2 | 10/2001 | |
| EP | 1691523 A1 | 8/2006 | |
| EP | 2113860 A1 | 11/2009 | |
| JP | S5218653 A | 2/1977 | |
| JP | S5218653 U | 2/1977 | |
| JP | S5239237 A | 3/1977 | |
| JP | H01226681 A | 9/1989 | |
| JP | H0263440 A | 3/1990 | |
| JP | H03272977 A | 12/1991 | |
| JP | H0517083 A | 1/1993 | |
| JP | H0558564 A | 3/1993 | |
| JP | H05201624 A | 8/1993 | |
| JP | 2000156676 A | 6/2000 | |
| JP | 2000332746 A | 11/2000 | |
| JP | 2001243707 A | 9/2001 | |
| JP | 2001274786 A | 10/2001 | |
| JP | 2001274788 A | 10/2001 | |
| JP | 2001285821 A | 10/2001 | |
| JP | 2002163396 A | 6/2002 | |
| JP | 2002335507 A | 11/2002 | |
| JP | 2002352094 A | 12/2002 | |
| JP | 2003058657 A | 2/2003 | |
| JP | 2003162600 A | 6/2003 | |
| JP | 2003233690 A | 8/2003 | |
| JP | 2003248508 A | 9/2003 | |
| JP | 2003296484 A | 10/2003 | |
| JP | 2003348508 A | 12/2003 | |
| JP | 2004030111 A | 1/2004 | |
| JP | 2004072721 A | 3/2004 | |
| JP | 2004120736 A | 4/2004 | |
| JP | 2004120738 A | 4/2004 | |
| JP | 2004303111 A | 10/2004 | |
| JP | 2005506627 A | 3/2005 | |
| JP | 2005519365 A | 6/2005 | |
| JP | 2005519501 A | 6/2005 | |
| JP | 2005339093 A | 12/2005 | |
| JP | 2006185473 A | 7/2006 | |
| JP | 2006311267 A | 11/2006 | |
| JP | 2007020144 A | 1/2007 | |
| JP | 3988079 B2 * | 10/2007 | ........... G11B 27/031 |
| JP | 2007534030 A | 11/2007 | |
| JP | 2007336553 A | 12/2007 | |
| JP | 2008005047 A | 1/2008 | |
| JP | 2008015936 A | 1/2008 | |
| JP | 2008021293 A | 1/2008 | |
| JP | 2008507905 A | 3/2008 | |
| JP | 2008167018 A | 7/2008 | |
| JP | 2008186272 A | 8/2008 | |
| JP | 2008206039 A | 9/2008 | |
| JP | 2008539631 A | 11/2008 | |
| JP | 2009071786 A | 4/2009 | |
| JP | 2009515238 A | 4/2009 | |
| JP | 2009176060 A | 8/2009 | |
| JP | 2009211632 A | 9/2009 | |
| JP | 2009239861 A * | 10/2009 | |
| JP | 2010502109 A | 1/2010 | |
| JP | 2010079902 A | 4/2010 | |
| JP | 2010183260 A * | 8/2010 | |
| JP | 2012505436 A | 3/2012 | |
| JP | 2012523614 A | 10/2012 | |
| KR | 20060009376 A | 1/2006 | |
| KR | 20100088652 A * | 8/2010 | |
| WO | WO-9617306 A2 | 6/1996 | |
| WO | WO-9929107 A2 | 6/1999 | |
| WO | WO-9963759 A2 | 12/1999 | |
| WO | WO-0018120 A1 | 3/2000 | |
| WO | WO-0072592 A1 | 11/2000 | |
| WO | WO-0103410 A1 | 1/2001 | |
| WO | WO-0110125 A1 | 2/2001 | |
| WO | WO-0137479 A1 | 5/2001 | |
| WO | WO-0156285 A1 | 8/2001 | |
| WO | WO-0160071 A2 | 8/2001 | |
| WO | WO-0169842 A1 | 9/2001 | |
| WO | WO-0177778 A2 | 10/2001 | |

(56) References Cited

FOREIGN PATENT DOCUMENTS

| WO | WO-0191474 A2 | 11/2001 |
|---|---|---|
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008070062 A2 | 6/2008 |
| WO | WO-2008080556 A1 | 7/2008 |
| WO | WO-2009020476 A2 | 2/2009 |
| WO | WO-2012021245 A1 | 2/2012 |

OTHER PUBLICATIONS

5C Digital Transmission Content Protection White Paper, Hitachi, Ltd., et al., dated Jul. 14, 1998, 15 pages.
Almeroth, IEEE Journal on Selected Areas in Communications, The Use of Multicast Delivery to Provide a Scalable and Interactive Video-On-Demand Service, pp. 1110-1122, vol. 14: No. 6, 1996.
Bodzinga., et al., "Enhancing the IPTV Service Architecture to Enable Service Innovation," International Engineering Consortium, May 1, 2006.
Butts, Tom, "Israeli Defense Technology Fuel's Vsoft's Software", pp. 1-2, http://www.vsoft.com/prints/israeli.sub.--defence.htm, Feb. 1, 1999.
Cantor., et al., "Assertions and Protocols for the OASIS Security Assertion Markup Language (SAML) V2.0," Oasis Standard, Mar. 15, 2005. Document ID: saml-core-2.0-os (http://docs.oasis-open.org/security/saml/v2.0/saml-core-2.0-os.pdf), 86 pages.
Cantor., et al., "Bindings for the OASIS Security Assertion Markup Language (SAML) V2.0," Oasis Standard, Mar. 2005, DocumentID saml-bindings-2.0-os, (http://docs.oasis-open.org/security/saml/v2.0/saml-bindings-2.0-os.pdf), 46 pages.
Carnoy, David, "Anthony Wood and Mike Ramsey at War," Success, Mar. 1999, pp. 52-57.
Congdon P., et al., "IEEE 802.1 X Remote Authentication Dial-In User Service (RADIUS) Usage Guidelines," RFC 3580—IEEE 802.1X Remote Authentication Dial-In User Service, 2003, pp. 1-30.
David P.A., "The Beginnings and Prospective Ending of 'End-to-End': An Evolutionary Perspective On the Internet's Architecture," Stanford Institute for Economic Policy Research, Aug. 2001, 34 pages.
DCAS Authorized <gwmw class="ginger-module-highlighter-mistake-type-3" id="gwmw-15487095474138963691403">Service Domain</gwmw>, Version 1.2, dated Nov. 4, 2008, 58 pages.
DCAS Authorized Service Domain, Version 1.2, Nov. 30, 2005, 56 pages.
DCAS Licensed Specification Abstracts, CableLabs Confidential Information, Jan. 12, 2006, 4 pages.
DVB (Digital Video Broadcasting), DVB Document A045 Rev. 3, Jul. 2004, "Head-end Implementation of SimulCrypt," 289 pages.
DVB (Digital Video Broadcasting); DVB SimulCrypt; Part 1: "Head-end architecture and synchronization" Technical Specification—ETSI TS 101 197 V1.2.1 (Feb. 2002), 40 pages.
Extended European Search Report for Application No. EP05848363, mailed on Aug. 26, 2009, 9 pages.
Extended European Search Report for Application No. EP12151109, mailed on May 23, 2014, 9 pages.
Federal Information Processing Standards Publication, US FIPS PUB 197, Nov. 26, 2001, "Advanced Encryption Standards (AES)," 47 pages.
Ford B., "Unmanaged Internet Protocol: Scalable Application-Friendly Internet Routing," Jul. 24, 2003, 6 pages.
Ford B., "Unmanaged Internet Protocol: Taming the Edge Network Management Crisis," ACM SIGCOMM Computer Communications Review, vol. 34 (1), Jan. 2004, pp. 93-98.
Furchgott, Roy, "Don't People Want to Control Their TV's?" The New York Times, Aug. 24, 2000, p. Gl.
Hamilton, David P., "Driving Force", The Wall Street Journal, Jun. 26, 2000, p. R12.
High-bandwidth Digital Content Protection System, Revision 1.091, dated Apr. 22, 2003, Digital Content <gwmw class="ginger-module-highlighter-mistake-type-3" id="gwmw-15487095483507149357216">Protection LLC</gwmw> Draft, 78 pages.
International Search Report and Written Opinion for Application No. PCT/US05/44537, mailed on Aug. 8, 2008, 4 pages.
Jacobs, Karen (Dec. 7, 1999) "Elevator Maker to Add Commercial Touch," The Wall Street Journal, pp. 1-2.
Kahaner, (Mar. 16, 1991) "Hitachi 1991 Technology Exhibition, Tokyo," Asian Technology Information Program, pp. 1-14.
Lewis M., "Boom Box", The New York Times Magazine, Aug. 13, 2000, p. 36.
Lipschitz Sugarman, Margo "A Picture of the Future" pp. 1-2, http://vvww.vsoft.com/prints/picture.sub.--of.sub.--the.sub.--future.htm, Dec. 20, 1999.
Marusic B., et al., "Share it!—Content Transfer in Home-to-Home Networks." IEEE MELECON 2004, May 12-15, 2004, Dubrovnik, Croatia, 4 pages.
Maxwell, Kim, Residential Broadband: An Insider's Guide to the Battle for the Last Mile, 1999, pp. 43-46, 308-312, John Wiley & Sons, Inc., New York.
McDevitt., et al., "Switched vs Broadcast Video for Fiber-To-The Home Systems," 1990, 11 pages.
Media Server; 1 Device Template Version 1.01, Jun. 25, 2002, 12 pages.
Merriam Webster, "Apparatus", 2015.
Metadata Specifications, CableLabs Asset Distribution Interface Specification, Version 1.1 MD-SP-ADI 1-104-060505, May 5, 2006.
Motorola Next-Generation CMTS Architecture Protecting Network Investments While Migrating to Next-Generation CMTS Platforms, 2004 Motorola, Inc.
Open Cable Specification entitled "Enhanced TV Binary Interchange Format 1 0" OC-SP-ETV-131F1.0-106-110128 dated Jan. 28, 2011, 408 pages.
OpenCable Application Platform Specification, OCAP 2.0 Profile, OC-SP-OCAP2.0-I01-020419, Apr. 19, 2002, 30 pages.
OpenCable Application Platform Specifications, OCAP Extensions, OC-SP-OCAP-HNEXT-I03-080418, 2005-2008, 163 pages.
Opencable, HOST-POD Interface Specification, OC-SP-HOSTPOD-IF-113-030707, Jul. 7, 2003, 42 pages.
OpenCable Specification, Home Networking Protocol 2.0, OC-SP-HNP2.0-I01-08418, 2007, 163 pages.
OpenCable Specifications, Home Networking Security Specification, OC-SP-HN-SEC-DO1-081027, draft (Oct. 27, 2008), 18 pages.
Parsons, Patrick R., et al., The Cable and Satellite Televison Industries, 1998, pp. 162-163, 170-172, Allyn and Bacon, Boston.
Perdue, Lewis (Jul. 20, 1999) "Forget Elevator Music Here Comes Elevator Internet," Internet VC Watch, pp. 1-2.
"Powerkey" family (Powerkey Book 2, Powerkey Book 3, etc.) NDS (including VideoGuard, mVideoGuard, etc.). ANSI/SCTE Standard 52 2003 (DVS-042).
Primergy BX300 Switch Blade user's manual, Fujitsu Corp., Sep. 30, 2002, first edition, pp. 1 to 20.
Real System Media Commerce Suite (Technical White Paper), at http://docs.real.com/docs/drm/DRM.sub-WP1.pdf, 12 pages, Nov. 2001.
Real System Media Commerce Suite Technical White Paper, Copyright 2011, Real Networks, Inc., 16 pages, (http://www.realnetworkis/).
RealSystem Media Commerce Suite Technical White Paper, Copyright, 2001 RealNetworks, Inc., http://www.realnetworks.com/, 16 pages.

(56) References Cited

OTHER PUBLICATIONS

Sadok D.H., et al., "Trends in Network and Device Composition," Topics in Internet Technology, IEEE Communications Magazine, Oct. 2006, pp. 112-118.

Stevens Institute of Technology, Spring 1999 Final Report, pp. 1-12.

Tandberg Television specification entitled "AdPoint.RTM. Advanced Advertising Platform" dated Mar. 2008, 2 pages.

Van Moffaert, A., et al. <gwmw class="ginger-module-highlighter-mistake-type-3" id="gwmw-15487095623201874158750">(</gwmw>"Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Videodick 2.0 is Now Available on Sun Servers, p. 1, http://www.vsoft.com/press1999d.htm, Apr. 19, 1999.

Vsoft Launches Videoclick .Copyrgt. Home at IBC 2000, pp. 1-2, http:/www.vsoft.com/press2000o.htm, Sep. 8, 2000.

Vsoft to Implement Its Advanced Videoclick Interactive TV Software on Power TV Based Digital Cable Set-Top Boxes, pp. 1-2, http://www.vsoft.com/press1999m.htm, Dec. 13, 1999.

Vsoft to Present First Set-Top Box Implementation of Its Digital Video Software Platform, Targeted to Service Providers of Digital Video Services for Home Video, p. 1, http://www.vsoft.com/press1999j.htm, Sep. 8, 1999.

Wikipedia, "Broadcast Switched," 2015, 1 page.

Wikipedia, "Content Delivery Network", 2015, 2 pages.

Wikipedia, "Hybrid Fibre-Coaxial," 2015, 1 page.

Wikipedia, "Packet Switching", 2015, 1 page.

Yoneda, et al. (Dec. 1997) "Multi-Objective Elevator Supervisory-Control System with Individual Floor-Situation Control," Hitachi Review, p. 1.

Zhang, et al., "A Flexible Content Protection System For Media-On-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2.

\* cited by examiner

METHODS AND APPARATUS FOR PROVIDING AND UPLOADING CONTENT TO PERSONALIZED NETWORK STORAGE

PRIORITY AND RELATED APPLICATIONS

This application is a continuation of, and claims priority to, co-owned and co-pending U.S. patent application Ser. No. 15/969,597 of the same title and filed on May 2, 2018, which is a divisional of, and claims priority to co-owned U.S. patent application Ser. No. 13/797,577 of the same title and filed on Mar. 12, 2013, which is incorporated herein by reference in its entirety. This application is generally related to subject matter of commonly owned U.S. patent application Ser. No. 11/440,490 filed May 24, 2006 and entitled "PERSONAL CONTENT SERVER APPARATUS AND METHODS", and U.S. patent application Ser. No. 11/811,953 filed Jun. 11, 2007 entitled "METHODS AND APPARATUS FOR PROVIDING VIRTUAL CONTENT OVER A NETWORK", each of the foregoing incorporated herein by reference in its entirety.

BACKGROUND

1. Technological Field

The present disclosure relates generally to the field of providing content over a network and other distribution channels, and specifically in one aspect to the configuration, delivery, upload, and storage of such content over a managed network such as e.g., cable television network.

2. Description of Related Technology

Recent advances in video capture and data storage technologies have led to the proliferation of consumer electronics devices that allow a user to record video programming or other content received from a bearer network (such as a cable television or satellite network) on a digital video recorder (DVR) or personal video recorder (PVR), and contemporaneously or subsequently access the content. The advent of PVR technology has greatly increased the ability of a subscriber to utilize certain content delivered over their cable system on their schedule. Some PVR devices can be used to transmit the stored content over a network interface to another device (which may or may not be remote from the PVR) where the same or another user can access the content. As a result, PVRs allow users a great degree of control over the playback and viewing of their selected content.

Additionally, network-based content recording and storage allow users of a network to obtain what would otherwise be "live" content (e.g., linear television broadcasts or the like) at a time convenient to the user. These systems typically receive instructions from the user as to which programming they want to view, and the network "cloud" streams the requested content to that user. Variants of these types of systems either receive prior instructions from a user before the broadcast of the live event, or alternatively store various content based on some other criteria (e.g., popularity), and then allow the user a period of time to watch it.

However, content source or copyright owner must have assurances that the network operator (e.g., multiple systems operator or MSO) which is entrusted with their valuable content will process and distribute this content within the limitations of the law, and not expose the content to undue risk of unauthorized reproduction or distribution. Content owners may be concerned with the reproduction of copies of their content within the network for distribution purposes. For example, a network operator may have restrictions on replicating and/or distributing content received from the content source. Certain activities are generally recognized as not being in violation of a content owner's copyright. For example, so called "time shifting" (i.e., recording or storing the content for later viewing), and "space shifting" (i.e., moving content from one device or medium to another) of content owned by a purchaser in certain circumstances are recognized by U.S. courts as not violating copyrights. However, the application of such rules is typically quite fact-specific, such as in the case of networked PVRs (NPVRs).

Network operators that provide users with personalized PVR functionality and storage in the network can simplify the distribution and upgrade process of their services, and offer potentially unlimited storage capacity, without sacrificing ease of use or convenience at the user end. However, current PVR and NPVR implementations avoid uploading content to network storage when the content has already been received at a PVR or NPVR, due in part to restrictions associated with upload bandwidth, thereby potentially leaving some copyright concerns unaddressed.

Accordingly, there is a need for improved methods and apparatus which effectively balances the preservation of copyright interests with the convenience and flexibility of PVR and NPVR functionality.

These methods and apparatus would also, in one embodiment, be provided using substantially extant network infrastructure and components, and would be compatible with a number of different client device and delivery systems, including both wired and wireless technologies.

SUMMARY

The foregoing needs are satisfied by providing improved apparatus and methods for content management and device configuration for uploading and storing content over a content network.

In a first aspect, a method of content management is disclosed. In one embodiment, the method is utilized within a content delivery network having a plurality of users, and the method includes receiving content at a client device, the client device associated with at least one of the plurality of users of the network; and in response to the act of receiving, causing at least a portion of the content to be uploaded to a storage entity of the network. In one variant, the storage entity is configured to store the content at a storage location specifically associated with at least the at least one user.

In another aspect, a network apparatus configured to obtain and store content from one or more client devices is disclosed. In one embodiment, the apparatus includes: a storage apparatus; and a digital processor configured to run at least one computer program thereon, the computer program comprising a plurality of instructions. In one variant, the instructions are configured to, when executed, cause the network apparatus to: configure at least one of the one or more client devices for upload; receive a request from at least one of the one or more client devices for the content; determine whether the requested content has previously been uploaded to a storage location specifically associated with the one or more client devices; and based at least in part on the determination, provide the requested content to the at least one of the one or more client devices.

In another aspect, a method of managing content via a content delivery network, so as to ensure copyright preservation is disclosed. In one embodiment, the method includes: recording a first content element on a recording device at a first location, the recording device being associated with a first user; automatically uploading the first content element to a second device at a second location, the second location being in communication with the first location via the content delivery network, the first content element being made accessible only to the first user so as to protect a copyright associated with the first content element.

In a further aspect, a consumer premises device is disclosed. In one embodiment, the device includes computerized logic configured to cause download of content from a network entity to the device (or a proxy thereof), and also upload of the content back to the same or different network entity, the receiving network entity having one or more access restrictions associated therewith.

In yet another aspect, a computer readable apparatus is disclosed. In one embodiment, the apparatus includes a storage medium and at least one computer program disposed thereon, the at least one program configured to, when executed, implement content copyright protection upload functionality.

DETAILED DESCRIPTION

Figure 1:
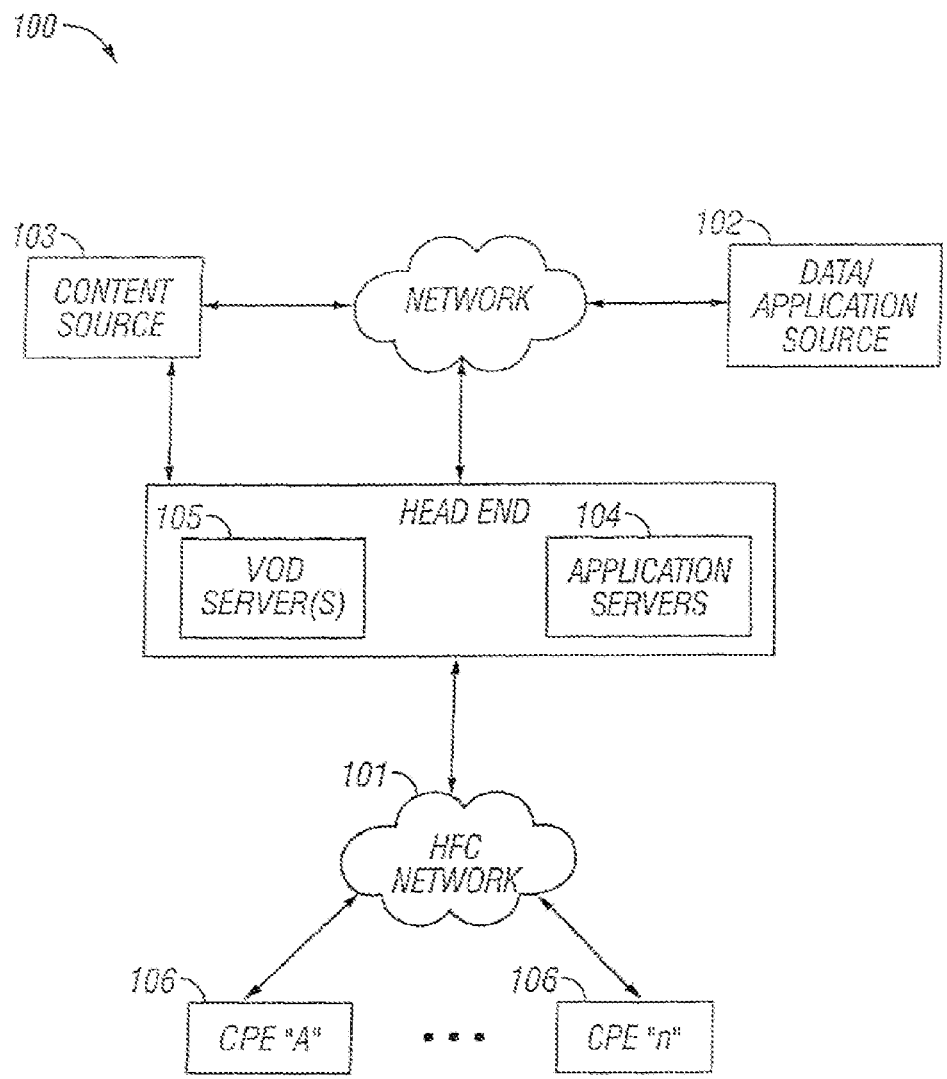
FIG. 1 is a functional block diagram illustrating an exemplary hybrid fiber coax (HFC) cable network configuration useful with various aspects of the present disclosure.

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), digital television sets, personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AVC/H.264, AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer without limitation to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment or function whereby content sent over a network can be recorded and selectively recalled, including without limitation so-called "personal video recording" (PVR) functions or devices. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include any information source/receiver including, inter alia, free-to-air TV channels, pay TV channels, interactive TV, and the Internet. DSTBs may take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, RDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "local" and "remote" refer generally to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may serve the very same premises.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple system operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "purchase" shall mean without limitation any sale, agreement for sale, transfer of funds, promise to transfer funds, barter arrangement, promotional or incentive agreement or arrangement, virtual ownership, subscription, or other relationship wherein consideration of any kind is exchanged between two or more parties (or their proxies).

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "recording medium" refers to any material, component, collection of components or device adapted to store information in a substantially permanent or semi-permanent state. Exemplars of recording media include, without limitation, magnetic media, integrated circuits (e.g., RAM or ROM), optical media, chemical media, and atomic- and subatomic-level storage structures (e.g., crystalline structures, quantum or spin states, etc.).

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G, LTE/LTE-A, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, improved apparatus and methods are provided to, inter alia, enable upload and storage of content over a network. In one embodiment, content stored on a CPE is uploaded to server at the head-end, as opposed to traditional network DVR functionality which records content for subscribers at the head-end before it is received by the CPE. The improved apparatus and methods disclosed herein may be useful, for example, as one potential model for preserving the digital rights of content owners.

In an exemplary embodiment, a CPE and/or server at the network head-end is configured with logic to manage content delivery, upload and storage. A user receives content from a content source (which may be the network, or yet another source), and automatically uploads the content to a network storage device, where a complete copy of the content is made available for subsequent streaming/download to the user (or user devices that are allowed access to the network storage device).

In addition, the system determines which content items have already been uploaded/stored to the head-end so that an optimal number of copies are stored at the head-end and/or client device. Further, uploads may be prioritized in accordance with the copyright of individual content items.

Detailed Description of Exemplary Embodiments

Exemplary embodiments of the apparatus and methods are now described in detail. While these exemplary embodiments are described in the context of the aforementioned hybrid fiber coax (HFC) cable architecture used in conjunction with e.g., a "secondary" communication channel or network, the general principles and advantages of the system may be extended to other types of networks and architectures where delivery of content is required or desirable, whether broadband, narrowband, wired or wireless, content or data, or otherwise, and irrespective of topology. Hence, the following description is merely exemplary in nature.

It will also be appreciated that while described generally in the context of a network providing service to a consumer (i.e., home) end user domain, the system may be readily adapted to other types of environments including, e.g., commercial/enterprise, and government/military applications. Myriad other applications are possible.

It is further noted that while aspects are described primarily in the context of 6 MHz RF channels within the HFC network, any frequency/bandwidth, such as for example 8 MHz channels may be applicable.

Furthermore, as referenced above, the system is in no way limited to traditional cable system frequencies (i.e., below 1 GHz), and in fact may be used with systems that operate above 1 GHz band in center frequency or bandwidth, to include without limitation so-called ultra-wideband (UWB) systems. For example, in one variant, high-bandwidth UWB signals imposed atop the traditional QAMs of the cable network are used to provide a high-speed data download capability for the content to be utilized at the subscriber's premises (e.g., applications or archived data).

Also, while certain aspects are described primarily in the context of the well-known Internet Protocol (described in, inter alia, RFC 791 and 2460), it will be appreciated that other types of protocols (and in fact bearer networks to include other internets and intranets) may be used to implement the described functionality.

FIG. 1 illustrates a typical generalized content delivery network configuration with which the personal media delivery apparatus and methods may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized. For example, the head-end architecture of FIG. 1a (described in greater detail below) may be used.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

Figure 1A:
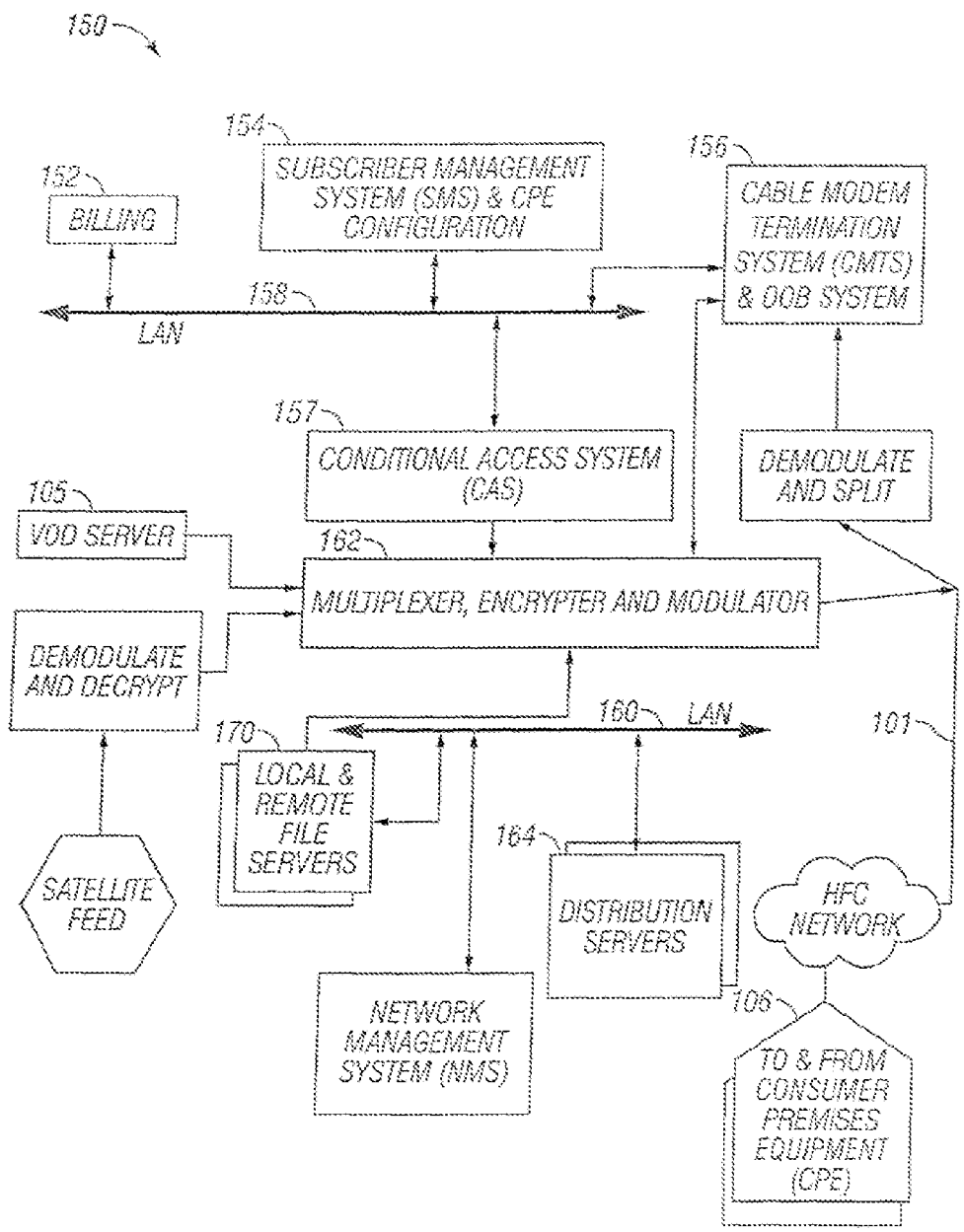
FIG. 1a is a functional block diagram illustrating one exemplary HFC cable network head-end configuration useful with various aspects of the present disclosure.

Referring now to FIG. 1a, one exemplary embodiment of a head-end architecture is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the system is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
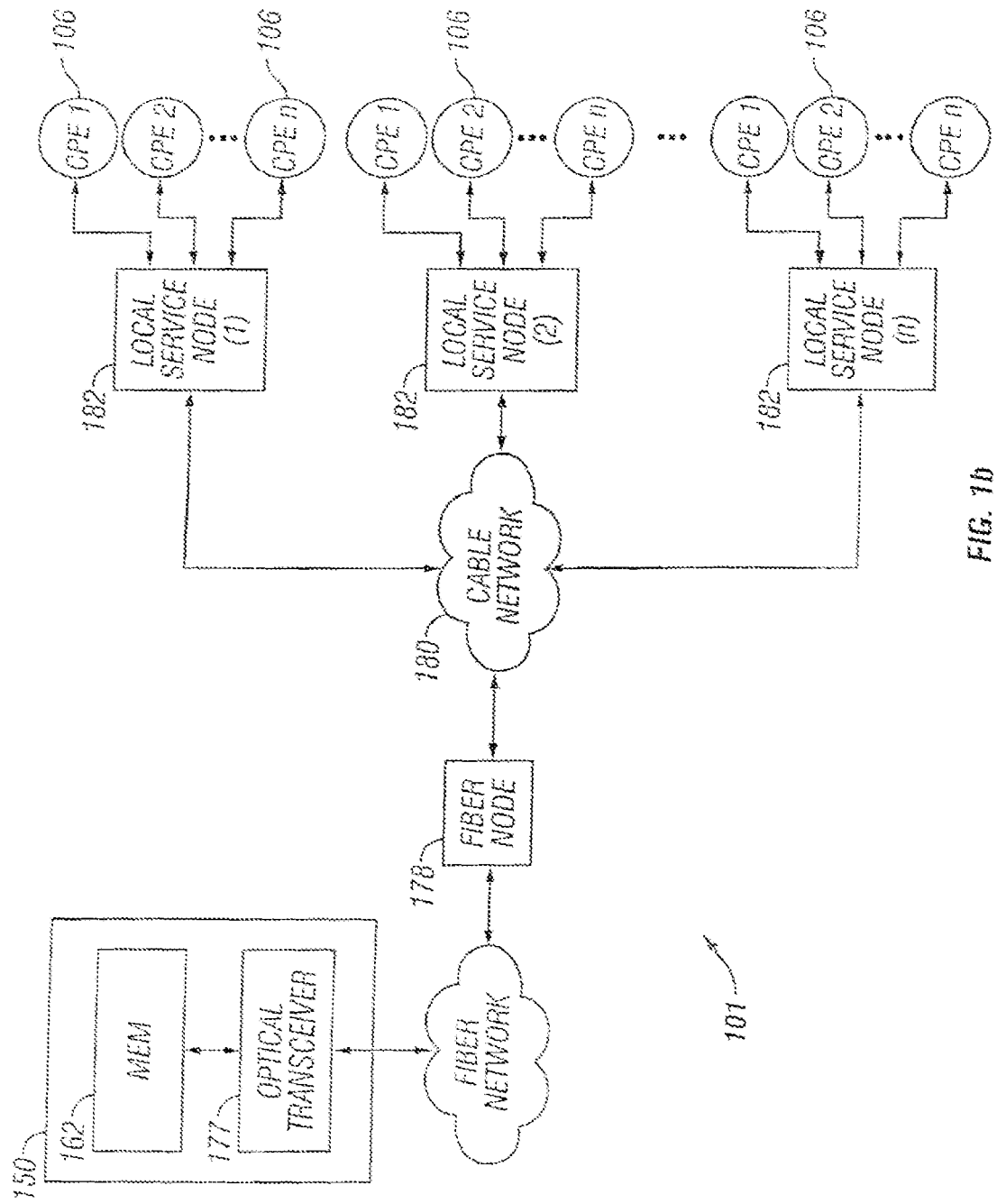
FIG. 1b is a functional block diagram illustrating one exemplary local service node configuration useful with various aspects of the present disclosure.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks

Figure 1C:
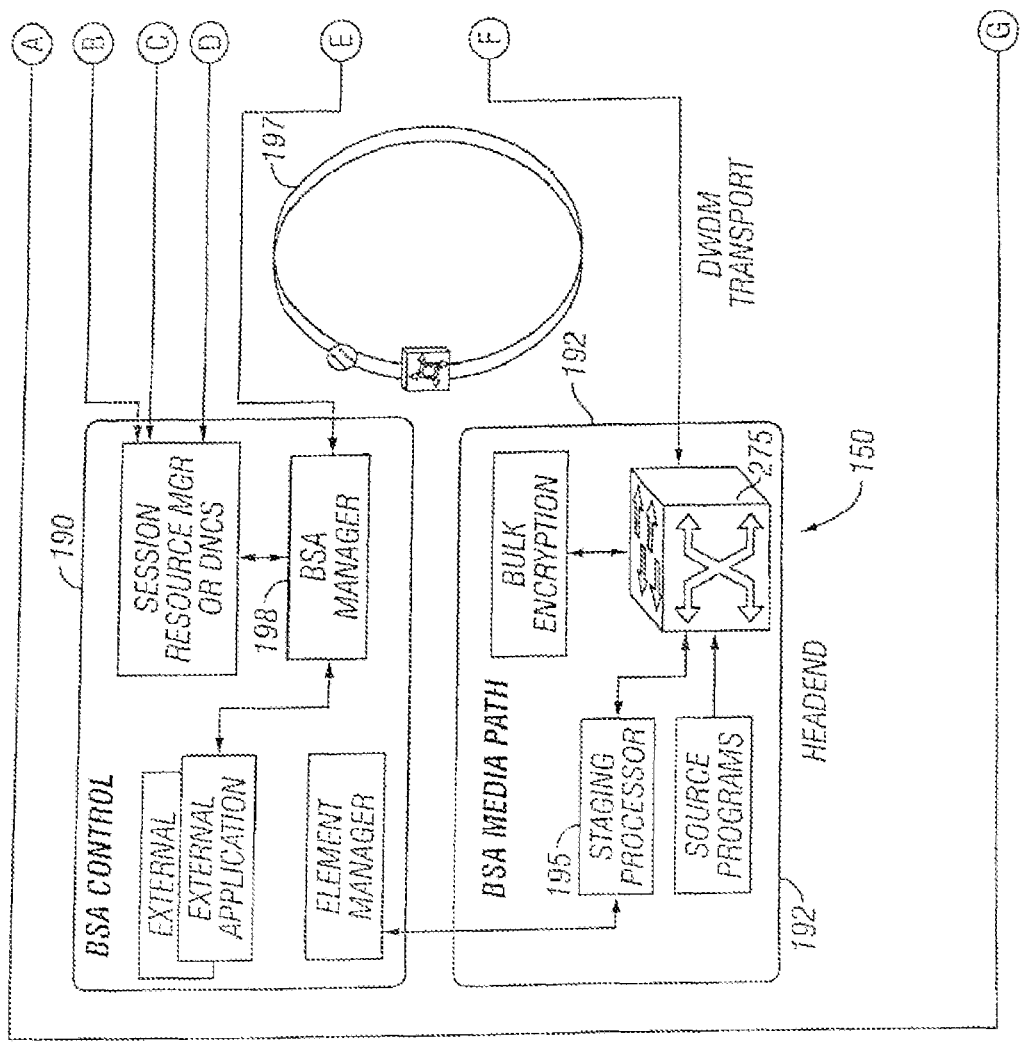
FIG. 1c is a functional block diagram illustrating one exemplary broadcast switched architecture (BSA) useful with various aspects of the present disclosure.
Figure 1C:
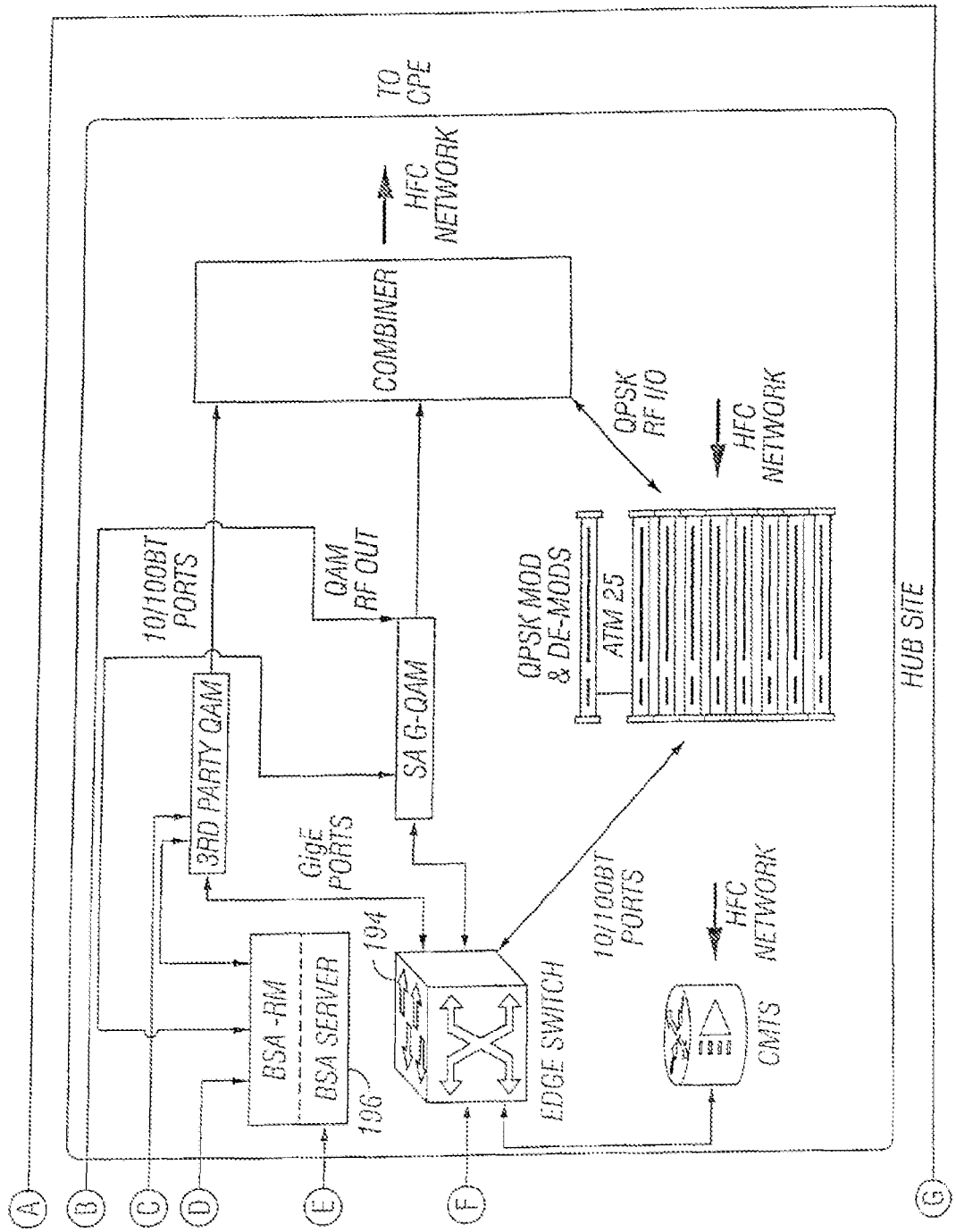

FIG. 1c illustrates an exemplary "switched" network architecture. While a so-called "broadcast switched architecture" or BSA network is illustrated in this exemplary embodiment, it will be recognized that the system is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture, although it will be recognized by those of ordinary skill that other approaches and architectures may be substituted.

In addition to "broadcast" content (e.g., video programming), the systems of FIGS. 1a-1c (and FIG. 1d discussed below) can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data (e.g., using an Internet Protocol (IP) networking protocol over one or more transports), other types of services that include multicast transmission of data delivered over a network having multiple physical channels or even virtual or logical channels may be used. For example, switching between various physical channels that comprise a virtual channel, can itself be conducted according to the "switched"

approach. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

"Packetized" Networks

Figure 1D:
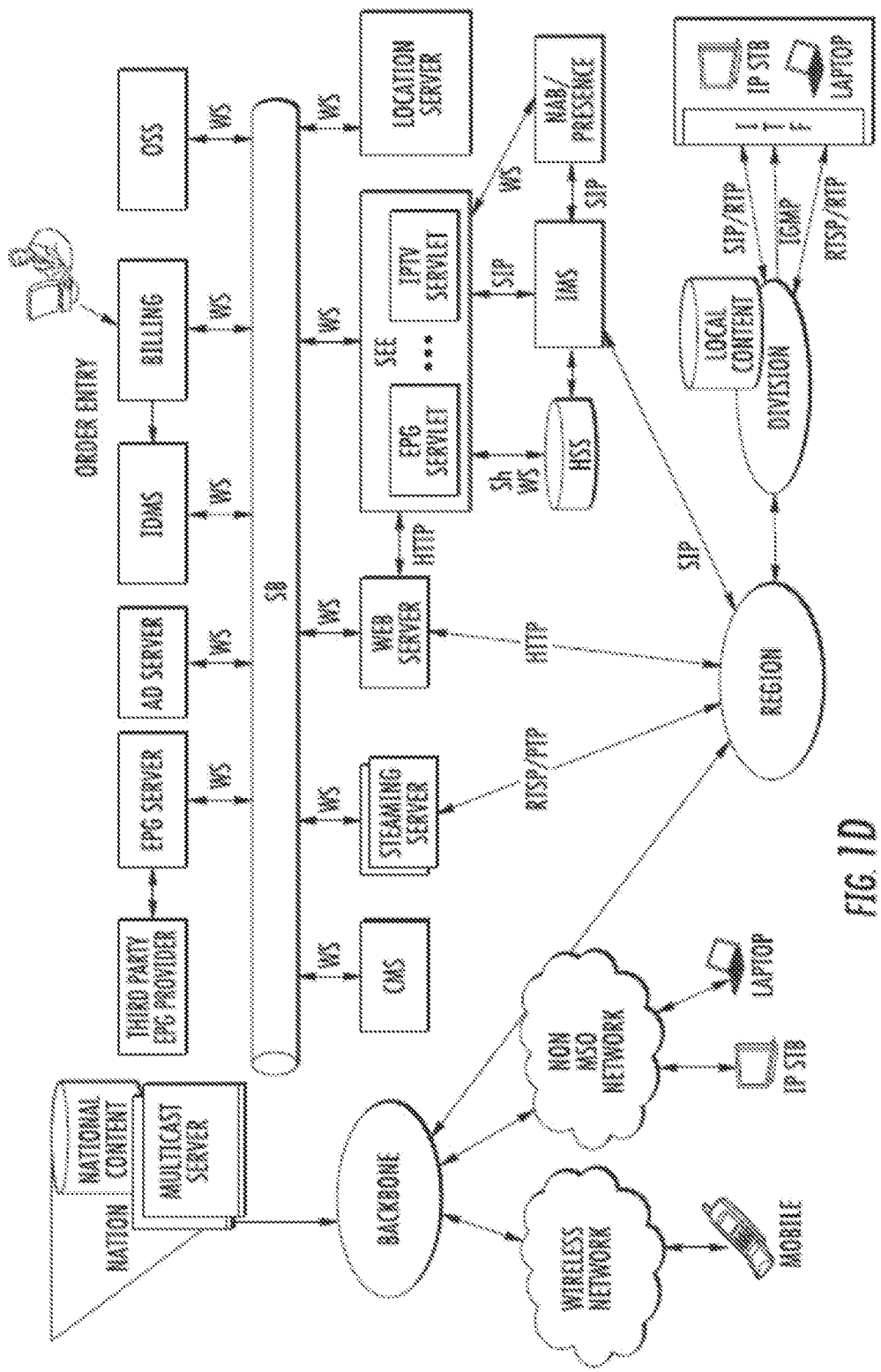
FIG. 1d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

System Architecture

Figure 2:
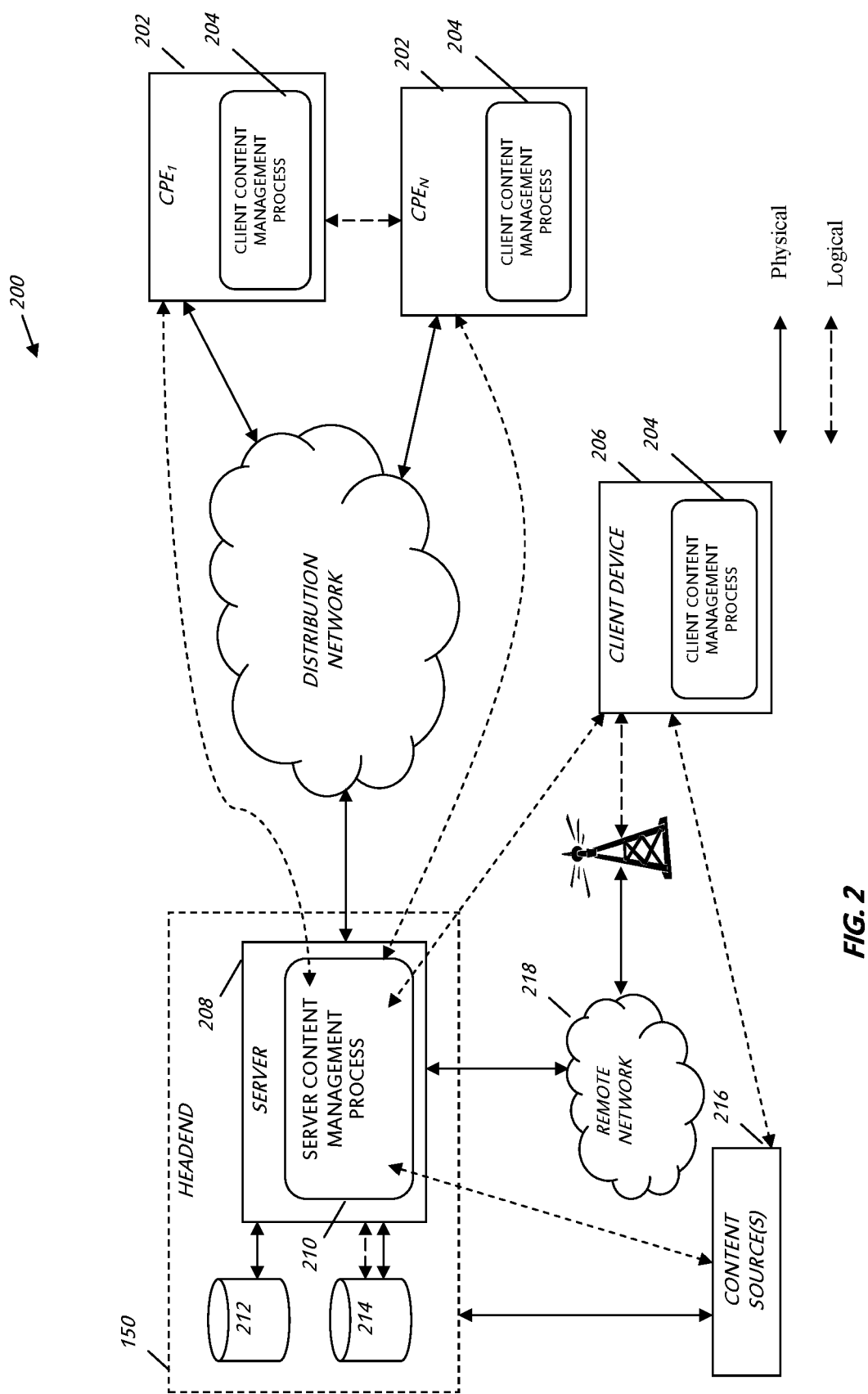
FIG. 2 is a functional block diagram of one exemplary embodiment of the system architecture according to the disclosure.

FIG. 2 is a functional block diagram showing an exemplary embodiment of the content distribution system architecture 200 according to the disclosure. It will be appreciated that this generalized architecture may be readily integrated into the existing architecture of a cable television network (such as those shown in FIGS. 1-1d), or alternatively used in conjunction with other types of networks (e.g., satellite networks, DSL networks, optical fiber networks, terrestrial wireless networks, hybrid fiber copper (HFCu) networks, etc.).

As shown in FIG. 2, the exemplary embodiment of the system architecture 200 generally comprises one or more servers 208 (e.g., VOD or broadcast servers) associated with one or more local storage devices 212, one or more network storage devices 214, one or more content sources 216, and one or more CPEs 202 and/or client devices 206.

As shown in FIG. 2, the head-end receives content from a source (such as a web server, studio, etc.) and processes the content into a format compatible with the MSO network. For example, processing may comprise (without limitation): (i) decryption; (ii) authentication of the content source (to prevent, e.g., "spoof" attacks or providing false or surreptitious content); (iii) virus or other mal-ware screening; (iv) encoding, decoding, or transcoding; (v) protocol translation or encapsulation; (vi) "upconversion" or "downconversion" of resolution, and/or (vii) filtration, error correction, or other conditioning of the content. Metadata or other such ancillary data may also be appended to or associated with the ingested content, as described in greater detail subsequently herein.

A client-server software architecture is employed in the exemplary embodiment to provide content management. The software may be employed either wholly or partially on the server-side, such as via a server content management process 210 (SCM). Additionally, the software may be employed either wholly or partially on the client side (e.g., as a client content management process 204 (CCM)). Each of the SCM 210 or CCM 204 may be physically and/or logically integrated into one device or process, or maintained as separate devices/processes even located at disparate locations, as described further below. Alternatively, the function may be implemented in a distributed manner where one or more functional aspects are implemented on multiple platforms.

In one embodiment, an object-oriented distributed application (DA) of the type well known in the art resides on the server portion of the DA, which in the illustrated embodiment can also function as the server content manager (SCM) 210, and is disposed at the head-end 150 of the network (such as on a VOD server or BSA manager 198). The client portion(s) 204 of the DA are disposed at a client device 202 or remote client device 206.

The content source 216 is also in communication with the server content management process 210, so that inter alia the content source can coordinate transfer of purchased or otherwise obtained content (or content prior to purchase) to the MSO network (e.g., local storage 212 and/or virtual storage 214), for supply to the CPE 202. The CPE 202 of the exemplary embodiment can communicate with the server 208 via any number of different channels including, e.g., an OOB upstream channel; in-band upstream channel allocated for this purpose, or a TCP/IP DOCSIS channel.

In one embodiment, the SCM 210 acts as the overall logical control or supervisory process for delivering content to subscribers. In this regard, the SCM 210 acts as somewhat of an overlay onto existing logical and physical processes occurring within the network including, e.g., authentication of subscribers, instantiation of VOD sessions, switching of BSA hubs to deliver content to various subscribers, multicast/unicast IP generation and delivery, etc.

In another embodiment, the CPE 202 communicates with the MSO network via a DOCSIS modem or other such interface, which then relays the communication to an external network (e.g., Internet), which in turn passes the communication to the content source server 218. For example, the user's PC or Wi-Fi connected laptop or tablet at their premises can access the content source website using e.g., the device's browser and TCP/IP protocols, via the indigenous DOCSIS modem, or yet another upstream channel (such as a WiMAX reverse channel, or LTE cellular data interface). In the illustrated example, the CPE 202 and the content source 218 act substantially as peers, and the interposed networks providing physical media and routing functions, although it will be appreciated that other approaches may be used (e.g., such as where processing, reformatting or encapsulation, security wrappers, etc. are applied to the packets issued by the client device by the intermediate networks, routers, and gateways).

After the content source 218 receives the communications (either directly or indirectly) from the CPE 202, it then communicates with the MSO server 208 as previously described. The CPE 202 then subsequently communicates with the server 208, requesting e.g., delivery such as streaming or broadcast of the purchased content. The MSO server portion (or its proxy) then streams or broadcasts the content to the requesting device, or a designated target client device (e.g., one associated with a network or client device on or off the premises, such as a Wi-Fi enabled mobile device).

Content is transmitted to the requesting purchaser's CPE 202 or client device 206, such as via a session between the content server and the CPE 202 (e.g. VOD) that transmits the content over one or more in-band downstream QAMs.

Alternatively, delivery may occur via a broadcast (e.g., BSA) mode, an IPTV (e.g., MPEG over IP) mode, unicast/multicast, via satellite link, or any other mode having suitable bandwidth and quality of service (QoS).

Delivery may also occur to remote or visited networks; e.g., to client devices that are outside the MSO or "local" delivery network. Co-owned and co-pending U.S. patent application Ser. No. 11/440,490 filed May 24, 2006 entitled "PERSONAL CONTENT SERVER APPARATUS AND METHODS", previously incorporated herein by reference in its entirety, discloses exemplary apparatus and methods for delivery of content to remote client devices and networks, although it will be recognized that other apparatus and techniques may be used for this purpose.

In one embodiment, the disclosed system 200 also advantageously provides for upload (such as a substantially automatic upload) of content to a server, storage device, or other network entity from a CPE 202 or other client device 206. This upload functionality of the system may serve as one potential model for preserving copyrights associated with delivered content. Specifically, by downloading the content to a particular user's (or group of user's) CPE, and then uploading the downloaded content in at least a substantially similar fowl, the receiving user or users has/have become the "owner" of the physical rendering of the content (contrast: copyright in the content) and any rights associated with that rendering (such as rights to perform, reproduce a copy for archival purposes, etc.), and hence what is uploaded back to the network can in fact be considered an "archival" or space-shifted copy of the content they already own. Note that in one implementation of the system 200 of FIG. 2, the content that is received by the CPE or other client 206 is stored on the receiving device in a substantially permanent form (as contrasted with purely ephemeral or transient storage), and then also transmitted upstream to e.g., the network server or storage device for storage thereon, in effect creating two separate versions of the content originally delivered to the CPE. Alternatively, the content received at the CPE/client 206 may simply be ephemerally stored or buffered (e.g., temporarily, while it is processed for upload), and then maintained only at the receiving network-side device, the ephemeral version being deleted. Under the first model, the user can advantageously access the local (CPE) version under most all circumstances, such as when no network connection is active. Likewise, the CPE 202 can act as a local content "server" of sorts for other clients or mobile devices in data communication with the receiving/storing CPE 202. However, the local content consumes significant storage space, and must then be managed with respect to reproduction, distribution, etc. Under the second "cloud based" model, user storage is obviated in favor of e.g., a streaming delivery, but this is obviously subject to network delivery/capabilities, and consumes downstream bandwidth within the network. Combinations or permutations of the foregoing are also envisaged, such as where a "local" copy is only accessible when the network or cloud copy is inaccessible, the network is experiencing downstream bandwidth constraints, a connected client at the CPE premises is requesting the content (and has no direct network access), etc.

In various implementations, the CPE 202 may be configured to automatically upload received content to a designated network storage device. Alternatively, SCM 210 on the server 208 may be configured to automatically initiate a content upload process (e.g., a content "pull") for content that has been delivered to a CPE 202 or client device 206.

The uploaded content can be subsequently downloaded such as via VOD, unicast/multicast to eligible subscribers, as a binary image or file, or other mechanism. For example, a user can upload content to a server for download/VOD access by others who have authorized access to the content-based network (perhaps other family members or friends), so these other persons can watch the uploaded content on their CPE or other desired platform, while preserving the digital rights associated with such content.

Network Upload and Storage

In one embodiment, virtual storage devices 214 are maintained for subscribers of the aforementioned networks (or other designated users), thereby giving client devices storage space that they could not otherwise have using their existing equipment. This can be used for any number of different reasons, such as: (i) to archive or back-up data, (ii) to permit access to a data volume by multiple MSO subscribers, (iii) to maintain the security of the data (i.e., when no local copy is present at the subscriber's premises, theft of their computer from the premises is much less troubling), or (iv) to provide the subscriber with storage volume that they could otherwise not obtain. It is also envisioned that the network storage devices 214 within the system can be used as one potential model for preserving the copyright interests of content owners.

The server 208 of FIG. 2 may further comprise or be associated with a storage entity which acts as a network digital video recorder (nDVR) for the CPE 202. In one embodiment, the network DVR may be of the type discussed in co-owned, co-pending U.S. patent application Ser. No. 11/440,490 entitled "PERSONAL CONTENT SERVER APPARATUS AND METHODS" and filed on May 24, 2006, previously incorporated herein by reference in its entirety.

While illustrated generally as a plurality of substantially local components, the architecture of FIG. 2 can have one or more components (such as e.g., storage devices 212 or 214) disposed at a remote location. In one variant, either local storage device 212 or network storage device 214 may be co-located and co-managed by a content source (e.g., studio) or third party. In one variant, requests to access content are processed by the MSO but serviced by content from one or more third party databases (e.g., the databases of studios or other content source can collectively act as the MSO's "virtual library"). Such servicing of content requests can be effectively real-time, with any encoding, annotation, inclusion of metadata, etc. performed essentially on-the-fly ("just in time" processing) if desired.

It may be desirable under certain circumstances (e.g., for certain business models, in order to address security or legal/copyright issues, etc.) to provide the user with some degree of "ownership" or control of the MSO network facilities, whether on a short-term or long-term basis. As such, the user or subscriber may: (i) lease or even own equipment within the network operator's infrastructure or facilities; and/or (ii) extend a virtual control boundary around one or more components or portions of the network operator's equipment or infrastructure.

In one variant, the user or subscriber leases or purchases storage space and/or playback functionality from the MSO. Such lease or purchase may be for a period of time (or number of uses, etc.), or even permanent if desired. To this end, the MSO or other network operator may utilize a highly modular architecture, such that the operations of the leased space/equipment for respective subscribers are largely or completely separated from one another. The MSO maintains the leased/owned equipment (including physical security thereof), and operates the equipment at the behest of the owner. For example, the MSO would determine the configuration of the device, perform software upgrades, periodic maintenance, control encryption/decryption of the stored content, regulate access thereto, etc.

In another variant, a virtual control boundary is further constructed around the subscriber's leased or purchased equipment, thereby allowing them to be in direct control of all aspects of the operation and access of their equipment. For example, one embodiment employs a software application disposed at the client premises (e.g., on their CPE 202) which communicates with a corresponding application or portion at the MSO node (e.g., head-end 150) that controls the operation of the leased/purchased equipment. In this sense, the MSO's equipment is in a very real sense in the possession and under the control of the subscriber, albeit being physically located at a place remote from the subscriber's premises (e.g., the head-end of the cable network). In another variant, these storage and recording/playback apparatus are disposed at a local hub site or other node even more physically proximate to the user's premises.

In another embodiment, the virtual control boundary may be constructed around a group of subscribers or be determined pursuant to determinations made by the server content management process 210. While network storage space is allocated to individual subscribers, other subscribers or the network operator may be able to access, retrieve and/or upload content pursuant to various business models. For example, in response to a request for a content item from a first subscriber, the MSO may access/retrieve that content item stored on the network storage of the second subscriber. This may prove useful in situations where a local copy of the content item is not easily available to the headend or for the purposes of saving storage space when the same or similar content item (i.e., same title, same personalizations, same encoding etc.) exists on the network storage. Alternatively, the MSO may grant access to the first subscriber to access or download content stored on the second subscriber's network storage space. Granted access may be limited to specific content (i.e., the content item that was requested) or limited in duration.

In one variant, subscribers may be grouped according to common characteristics and allowed varying levels of access to other subscribers' network storage space within the same group. For example, subscribers could be grouped according to subscription type, geographic location, node location, or similarities in requested content. Subscribers belonging to the group may access/retrieve content that is stored on the network storage space of other group member's network storage space or network storage space that is specifically allocated for the group.

It will be appreciated that various business models may also be constructed around such "virtual possession" schemes, including for example where the user or subscriber can themselves specify or configure the equipment that they lease or own, much like one currently configures a PC or laptop from a manufacturer at time of purchase. A user can also be provided with the capability of changing or upgrading their equipment, such as for more storage space, different codecs, network interfaces, conditional access, encryption/authentication schemes, indigenous processing or signal conditioning capability, etc.

The network storage device 214 may store content and/or the operating system of the subscriber's CPE 202. In one variant, the CPE 202 operating system may reside entirely off-device, including at the MSO head-end or other such location if desired. Moreover, the data volumes for each subscriber may be encrypted, authenticated, and made physically secure, thereby providing a level of protection that exceeds that of the normal home PC, PMD, or the like.

The virtual storage device 214 can also be made part of a business paradigm; e.g., wherein the user pays a fee (such as on a per-Tb used) or subscribes for X terabytes of storage space for a given period of time.

In one embodiment, the virtual storage device 214 provides storage space for MSO subscribers to upload content to the server 208 or other network entity. The uploaded content can then be accessed, downloaded and/or streamed by a linked subscriber.

In one embodiment, the uploaded content comprises user-generated content. For example, using a cellular phone or tablet camera, microphone, etc., user can stream video up to the VOD server for download/VOD access by others who have authorized access to the content-based network (perhaps other family members or friends), so these other persons can watch the uploaded content on their client device or other desired platform (e.g., PC).

It will also be appreciated that uploaded (e.g., copyright-protected) content may be shared across multiple unrelated "eligible" users of the network. For example, suppose CPEs A, B, and C (each associated with different subscribers at different premises) all download content from the network, such as via respective VOD purchases. Under one implementation, the downloaded content is uploaded by each of the users (e.g., automatically, as described elsewhere herein) to a network storage location. The storage "location" may comprise a common storage area or server (e.g., all three users utilize the same storage), or three (separate) storage areas for each of the users. Hence, any number of logical and/or physical storage partitioning schemes may be utilized consistent with the present disclosure. In one paradigm, all three users in this example maintain separate, independent storage and access thereto. Alternatively, the users may employ a common storage/access approach, such as where each of the users can access a common copy of the content (assuming it is identical). This latter approach economizes on storage requirements in the cloud, since only one copy need be maintained (versus three) in this example. Moreover, upstream bandwidth requirements/latency can in some cases be reduced, since all three copies in the foregoing example need not be uploaded (assuming identical content), but rather only one. Hence, in one variant, the architecture 200 of FIG. 2 is configured such that it includes logic which identifies such commonalities (especially those occurring within a prescribed temporal window), and leverages them to obviate consumption of upstream bandwidth or undue latency for the users. For instance, where the CPE A, B and C of the prior example all request download of content element X within a few minutes of each other, the first downloading device (say, CPE B) initiates its upload first, and the remaining CPE A and C are in effect "waived off" by the network content management process 210 (or other entity) from having to upload their delivered content as well, such as via downstream in-band or OOB message or other signaling.

Likewise, a single cloud-based copy of the content can be logically "interlocked" between two or more users (such as by logic within the management process 210) such that if the content is being accessed by one eligible user, it cannot be accessed by another until the first has completed.

Moreover, where the demand for the content from the network-side storage element will not be immediate, upstream assets can further be optimized through "opportunistic" use of these assets; e.g., a "trickle" and/or "bursty"

delivery upstream as time/resources permit. It is also envisaged that different portions of the content may be uploaded from different CPE, so as to in effect cobble together one complete version or copy from multiple sources.

Network Server and Content Management

Figure 3:
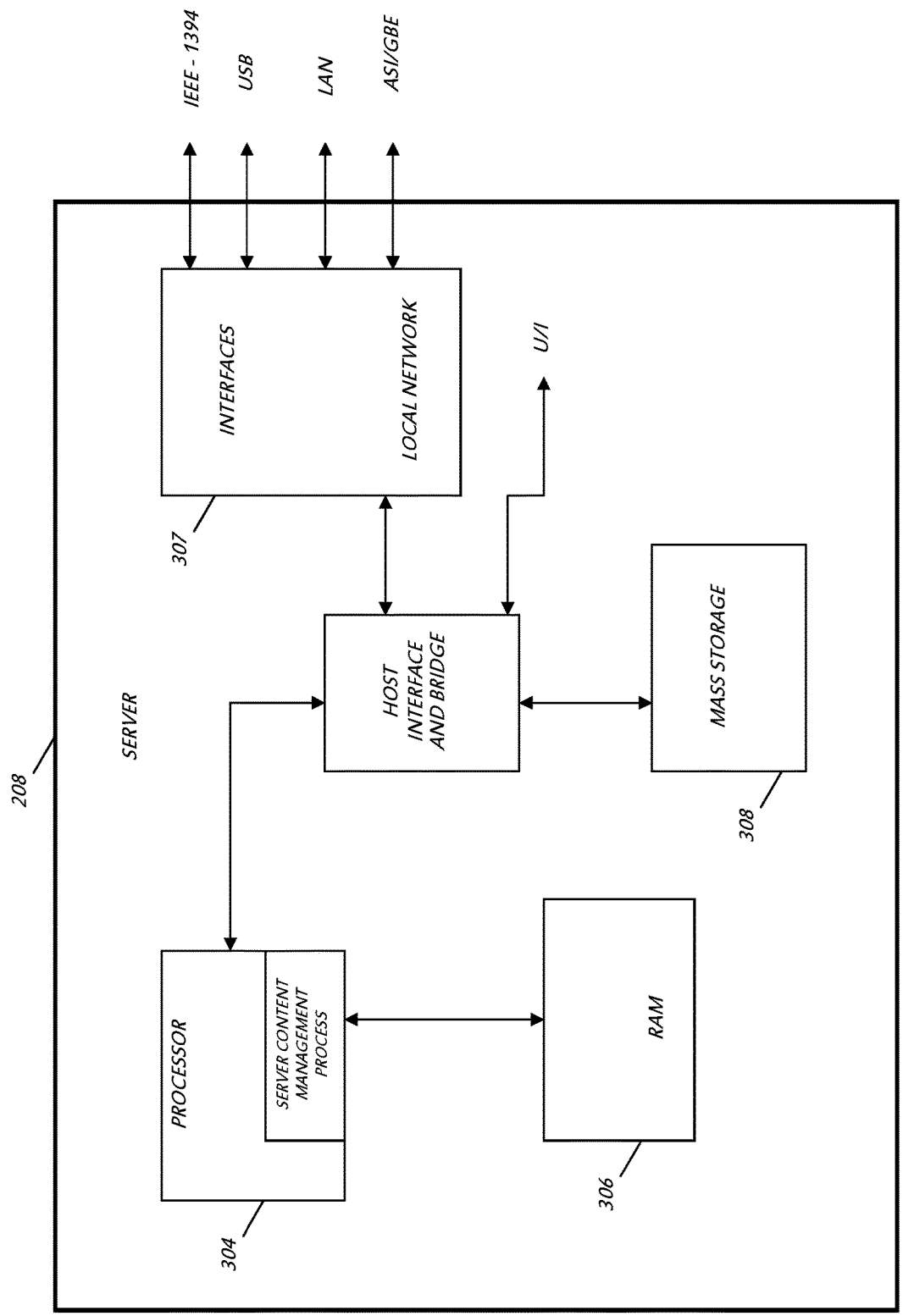
FIG. 3 is a functional block diagram of one exemplary embodiment of a network server apparatus adapted for use with the system architecture of FIG. 2.

Referring now to FIG. 3, one embodiment of the improved network content server 208 adapted for content delivery and upload according to the disclosure is described. As shown in FIG. 3, the server 208 generally comprises a network server module adapted for interface with the networks of FIG. 2, digital processor(s) 304, RAM 306, a mass storage device 308, and a plurality of interfaces 307 for use with other network apparatus such as LANs, routers, and other packet network devices, network management and provisioning systems, local PCs, etc. Other components which may be utilized within the server include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SIP, LSCP, etc.) may also be provided as required. Where the content server is also acting in a local network capacity (e.g., as a VOD or application server), an appropriate application is also disposed to run on the server to provide a functional interface for e.g., VOD session requests received from the client device or other interposed entities. These additional components and functionalities are well known to those of ordinary skill in the cable and embedded system fields, and accordingly not described further herein.

As previously discussed, the server 208 also may run the server content management process 210 (SCM). The SCM 210 may be integrated into the server portion of a distributed application process, or alternatively comprise a discrete or stand-alone module having inter-process communication with the server portions (or portions where multiple content servers and server portions are used in conjunction with the SCM 210).

In one variant, the SCM 210 may determine whether the content was previously requested and/or stored on the subscriber's CPE 202 attached to the local (cable) network. This information is gathered by either querying the CPE 202, or by querying a process at the head-end for the program titles stored by or on the CPE 202. In one embodiment, in response to a determination that content has been stored or partially stored on a CPE 202, the SCM 210 may initiate an upload process.

The SCM 210 may also be configured to facilitate reception of uploaded content to the server 208 or other designated host/storage entity. In one variant, uploaded content is received at the network storage device 214 previously described herein. Uploaded content may be stored and organized for example according to metadata associated with the content, or other approach. Metadata information may for instance include description of the content (e.g., title, genre, subject, file type) or details about the data (e.g., size, last updated, source).

In other variants, uploaded content is stored and organized according to predefined rules set by content owners, network operators, users, or a combination thereof. For example, it may be useful for the MSO to index the stored content according to one scheme or rule set (e.g., that minimizes access time, required storage volume, or addresses other parameters), while the user may obtain the best user experience or ease of use through a different organizational scheme. Additionally, content may be stored and organized according to a CPE identifier and/or user identifier that the SCM 210 can cross-reference and use to direct the storage of data. The SCM process 210 may also include options for the configuration of the display and storage of the uploaded content.

Figure 4:
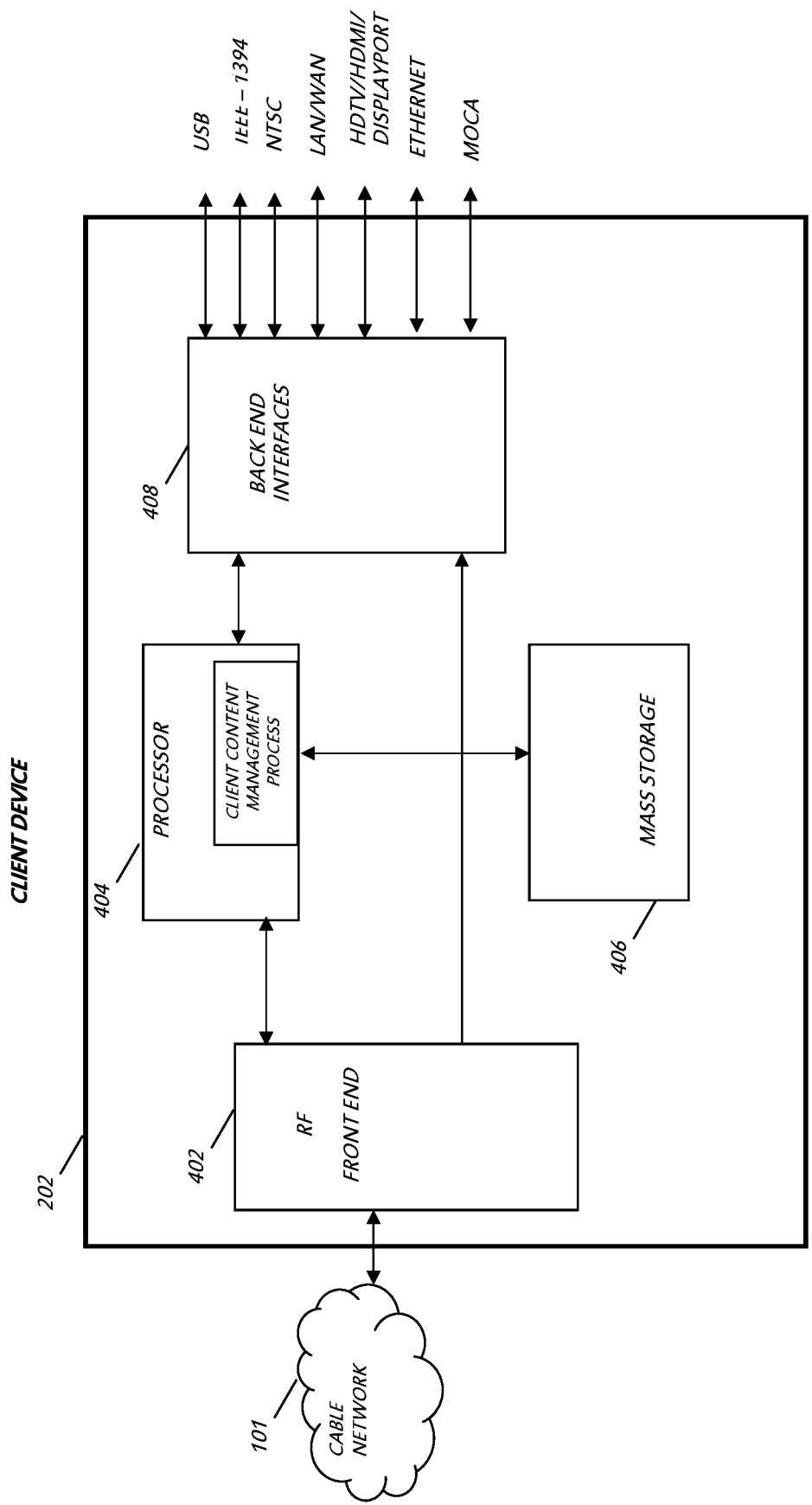
FIG. 4 is a functional block diagram of one exemplary embodiment of consumer premises equipment (CPE) adapted for use with the system architecture.

The server device 208 of FIG. 4 may take any number of physical forms, comprising for example one of a plurality of discrete modules or cards within a larger network head-end or edge device of the type well known in the art. The server may also comprise firmware, either alone or in combination with other hardware/software components such as those previously described (e.g., disposed in the aforementioned edge device). Alternatively, the server module 208 may be a stand-alone device disposed at the head end or other location (such as a VOD server 105 or application server 104), and may even include its own RF front end (e.g., modulators, encryptors, etc.) or optical interface so as to interface directly with various portions of the HFC network 101 if desired. Numerous other configurations may be used with any configuration or combination of hardware, firmware, or software, and may be disposed within one or any number of different physical or logical entities.

CPE Architecture and Operation

FIG. 4 illustrates a first exemplary embodiment of the improved CPE 202 with content selection, download, and upload capability.

In the case of HFC or satellite networks, the CPE 202 in one embodiment comprises a client device in the form of a set-top box with a tuner stage or front end adapted for interface with the relevant physical medium (e.g., connected to the coaxial cable, or a satellite antenna). The CPE 202 may or may not include DVR/PVR functionality. Also, the CPE 202 may not be a physically separate or stand-alone piece of equipment, but be integrated into another device, such as in the case of a cable-ready television set. It will be recognized by those of ordinary skill that myriad different device and software architectures may be used consistent with the content selection, download, and upload functionality, the device of FIG. 4 being merely exemplary.

As shown in FIG. 4, the CPE 202 generally comprises an OpenCable-compliant embedded system (e.g., DSTB) having an RF front end 402 (including tuner and demodulator/decryptors) for interface with the HFC network, digital processor(s) 404, mass storage device 406, and a plurality of interfaces 408 (e.g., video/audio interfaces, IEEE-1394 "FireWire", USB, serial/parallel ports, ThunderBolt, Ethernet, MoCA, etc.) for interface with other end-user apparatus such as televisions, personal electronics, computers, Wi-Fi or other network hubs/routers, etc. Although various protocol are illustrated in FIG. 4, it is appreciated that the CPE 202 of the present disclosure may be configured to communicate over any current and future wireline protocols. Other components which may be utilized within the device (deleted from FIG. 4 for simplicity) various processing layers (e.g., DOCSIS MAC or DAVIC OOB channel, MPEG, etc.) as well as media processors and other specialized SoC or ASIC devices. The CPE 202 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 202 of FIG. 4 is also provided with an OCAP-compliant application and Java-based middleware which, inter alia, manages the operation of the device and applications running thereon. Different device and software architectures may be used consistent with the tuning and channel request functions, for example, different middlewares (e.g., MHP, ARIB, or ACAP) may be used in place of the OCAP middleware of the illustrated embodiment.

As part of the application layer of the CPE 202 protocol stack (not shown), various different types of client applications may be operational. In one embodiment, a separate (dedicated) client application adapted for content selection, browsing, download, and upload may be used to interface with the lower layers of the stack. This may include, e.g., a separate GUI or other type of UI, and may operate substantially independent of other applications on the CPE 106. Alternatively, the selection, download, and upload functionality described herein may be integrated into one or more existing or downloadable applications (such as a VOD application, "Watch TV" application, navigator, TV-commerce application, or even EPG). The application (and even session) layer protocols necessary to control the content selection, download, and upload functionality may even be disposed on another device (e.g., PDA or cellular smartphone) as previously described in order to instigate the browsing, selection, purchase, download/streaming, and upload of content.

In another embodiment, the client application can function in response to signals or communications provided by a device in communication with the CPE 202. For example, the CPE 202 may comprise a wireless interface (e.g., 802.11 a/b/g/n, Bluetooth, 802.15 PAN, 802.16 WiMAX, 802.20, etc.) such that it can service content selection, payment, download/streaming, and upload requests from client devices of the CPE 202 itself. In one such variant, the client device comprises a tablet, smartphone, PDA, gaming console, or similar handheld device that has a distributed portion of the client application running thereon. This application may be stand-alone or integrated with another application. Hence, users operating the distributed client application on the tablet/smartphone/PDA will utilize their wireless interface to the CPE 202 in order to remotely instigate a content download or upload from the network via the CPE, the latter in effect acting as a gateway to the content distribution network. The wireless forward channel(s) of the interface (e.g., CPE to PDA) can be used to transmit the content after processing (e.g., decoding) by the CPE, or even stream the "raw" unprocessed content (or even the received and demultiplexed MPEG encoded packets) to other client devices and/or network storage.

The exemplary client device 202 further comprises a personal content or media application, which allows a user to manage his/her personal content. Such management includes, but is not limited to, the ability to browse through content stored to see which are available for viewing, select content for local viewing, and configure various parameters associated with the upload of content. As previously described, the content available for viewing may be stored locally, or alternatively may be stored remotely, such as at the head-end, BSA hub, or even a third party content source.

The personal content application is also responsive to a network-side application (e.g., server portion of a DA) that queries the client device 202 to check on the content titles stored on the client device 202 (when a local storage model is used), and upload data related thereto.

In one implementation, the client program resident on the CPE 202 tracks and reports user activity related to personal content viewing to the relevant server(s) for each client device. This activity tracking is useful from a number of perspectives, including: (i) determining when content is stored or uploaded to a network storage device; (ii) determining when programs are added or deleted from the local storage (e.g., subscriber's DVR); and (iii) for billing purposes. This tracking can also be performed in a substantially anonymous fashion, such as through use of cryptographic hashes of TUNER ID, MAC, and similar variables as described in co-owned, co-pending U.S. patent application Ser. No. 11/186,452 filed on Jul. 20, 2005 and entitled "METHOD AND APPARATUS FOR BOUNDARY-BASED NETWORK OPERATION", which is incorporated herein by reference in its entirety. Such mechanisms allow for specific identification of the CPE 202 which has recorded or accessed content, without necessarily having to know the subscriber's identity.

Furthermore, an application on the CPE 202 can be made to be responsive to the user's commands to control the DVR from the remote or visited network. Such a logical connection from the remote network to the LCD can be implemented using any number of different approaches, including direct communications between the CPE 202 and the remote client device 206 (e.g., via Internet), relayed communications that pass through the MSO (local) infrastructure and so forth. Allowing the subscriber to set up such a connection provides a remote management interface to managing the CPE 202 to perform personal media related functions, among others, thereby adding significant flexibility to the operation and utilization of the remote content access functionality.

As previously discussed, content can be uploaded to the MSO or third party network storage device, and subsequently downloaded/streamed and viewed at the subscriber's premises (or those of other subscribers authorized to view the content). Such download may also be to a second appropriately equipped remote client device 206. Content may be uploaded on an upstream channel of the cable network, or through another network such as through a cell network (e.g., LTE/LTE-A) or 802.16 wireless, or via a broadband Internet connection (such as e.g., optical fiber, wireless, or other mechanism.

In one embodiment, the upload functionality may be automatic or otherwise completely transparent to the end user, such as where an application running on the CPE 202 (or an associated device) (i) initiates a session if not already established, (ii) uploads the data, including any necessary error correction and/or retransmission, and (iii) manages termination of the session. The upload may comprise any form of transmission, such as binary image, streamed, one or more files, etc.

Individualized Content Channel Variants

In one aspect, the foregoing techniques of local receipt (and optional storage) and upload back to the network or other entity may be combined with personalized virtual or other content channel approaches to, inter alia, leverage data relating to user behavior on a per-user basis. See for example co-owned and co-pending U.S. patent application Ser. No. 12/414,554 filed Mar. 30, 2009 entitled "PERSONAL MEDIA CHANNEL APPARATUS AND METHODS" which is incorporated herein by reference in its entirety, which discloses among other things, methods and apparatus for "fused" targeted content delivery in a content-based network. Specifically, a substantially user-friendly mechanism for viewing content compiled from various sources is provided, including, inter alia, DVR, broadcast, VOD, Start Over, etc. Content selected to align with a user's preferences is displayed as a substantially continuous stream as part of a "virtual" user-based channel. In one embodiment, a user profile is constructed and targeted content gathered without requiring any user intervention whatsoever; e.g., based on a user's past or contemporaneous interactions with respect to particular types of content. This information can be generated by, for example, a recommendation "engine" such as that described in co-owned and co-pending U.S. patent application Ser. No. 12/414,576 filed Mar. 30, 2009 entitled "RECOMMENDATION ENGINE APPARATUS AND METHODS" which is also incorporated herein by reference in its entirety. The "virtual channel" acts as a centralized interface for the user and their content selections and preferences, as if the content relevant to a given user were in fact streamed over one program channel. The compiled content may also presented to the user in the form of a "playlist" from which a user may select desired content for viewing and/or recording. The user is able to navigate between on-demand content, the virtual channel, an EPG, a search tool, and a DVR navigation tool from a single user interface (e.g., on-screen display).

In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing.

Hence, in one variant, logic is included within the CPE and/or network content management entity (e.g., SCM 210) such that the items which are selected to populate the user's virtual channel are selectively downloaded (and then uploaded back to the network for storage), so as to populate the storage entity of the network associated with that user with content that has been particularly selected for that user/premises. When a user selects something outside of the recommended content, the logic is configured in one embodiment to cause download and upload of that content onto the storage entity, so as to update the storage on a rolling basis.

Method of Uploading

Figure 5:
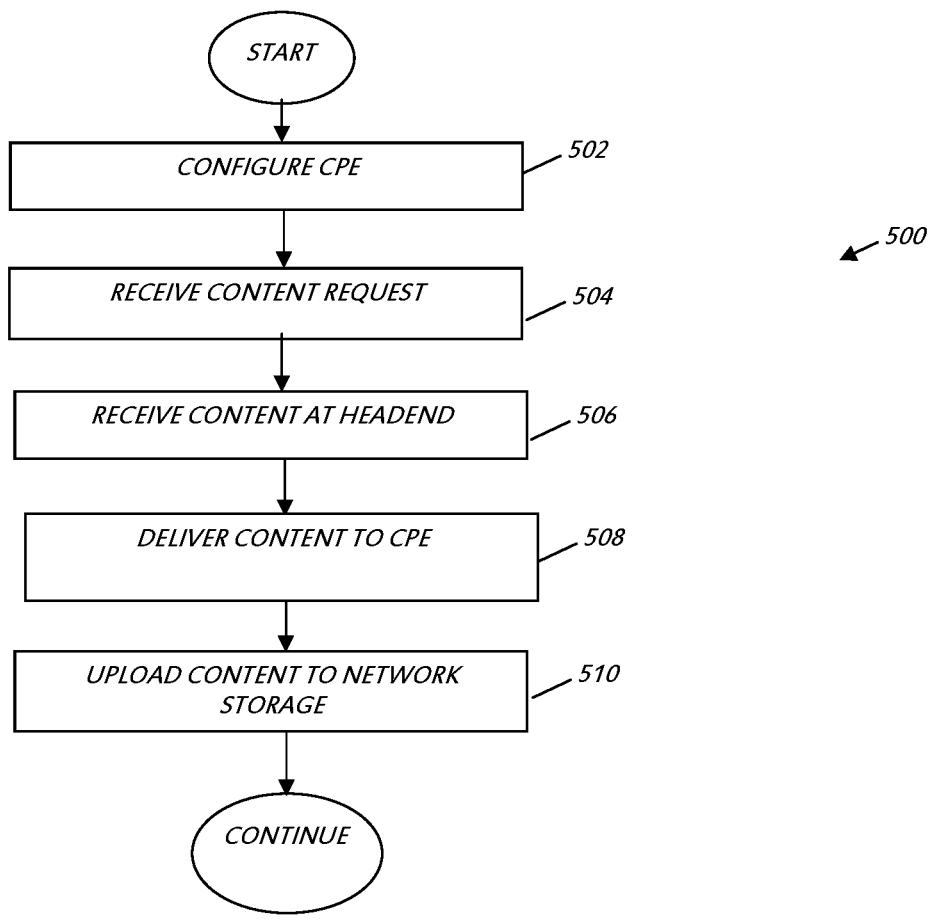
FIG. 5 is a logical flowchart illustrating one embodiment of the generalized content delivery, upload and storage methodology of the disclosure.

FIG. 5 shows one exemplary embodiment of the generalized method of delivering, uploading, and storing content over a network as described. It will be appreciated that while the following embodiment is described primarily in terms of an on-demand (OD) "session" based model delivering content over an in-band channel, the system is equally adapted to non-OD models such as broadcast/multicast (described in detail subsequently herein), data/content download via a cable modem (e.g., IP transport modality), out-of-band (OOB) communications channel, etc., the VOD exemplar being merely illustrative of the broader principles of the disclosure.

In a first step 502 of the method 500, a CPE 202 is configured. In one embodiment, the server content management process 210 configures the CPE 202 to operate in a determined fashion. Alternatively, the client content management process 204 configures the CPE 202 to operate in a determined fashion. In one variant, the CPE 202 is configured to designate a server 208 and/or network storage device 214 for the reception of uploaded content. The CPE may also merely upload the content "blindly" to a designated network address (e.g., cache or buffer), which is then processed by a head-end or other entity in order to properly record the content in a fashion accessible by the user.

In another variant, the CPE 202 may be configured to automatically upload content at a predetermined time. In yet another variant, the CPE 202 may be configured to automatically upload content upon the occurrence of an event (e.g., expiration of a timer, receipt of a message from the network, sufficient bandwidth availability, etc.). In still yet another variant, the CPE 202 may be configured to automatically upload in response to a user upload command. Various techniques for the configuration of the CPE 202 will be discussed further herein.

In step 504 of the method 500, the desired content is made available, and purchased or requested by a user (e.g., MSO subscriber). The request for the content may be instigated from the CPE 202 or a client device 206, or may be as a result of interaction with a third party (e.g., content source) web server, operator or other such network agent.

In one embodiment, a user is provided with a listing of available content, comprising e.g., one or more entries corresponding to different content titles, encoding formats, features, purchase options, and so forth, via a user interface. For example, one variant utilizes an on-screen display or GUI, generally similar to the well-known electronic programming guide (EPG), that lists the various choices available for purchase. These might be indexed by category (e.g., feature length movie, gaming application, video "shorts", music, etc.), and sub-indexed by genre (e.g., comedy, drama, etc.), alphabetically by title or primary actors, etc. Alternatively, a user might simply be presented with a short GUI menu or pop-up display mechanism (e.g., window) listing new releases for that week or month. The user interface can be invoked in response to a user request, such as for example by selecting a button on the user's remote that interacts with their CPE 202, at a pre-designated periodicity (e.g., once per week), upon the occurrence of a particular event (e.g., new release), or at the instigation of the MSO, although myriad other approaches will be recognized by those of ordinary skill.

It will be appreciated that such user interface is not limited to the MSO network domain either. For example, as described in greater detail subsequently herein, the user interface may comprise part of a PMD or mobile device (e.g., PDA or smartphone), which can access the MSO virtual database manager from a remote location or network.

Once the user makes their selection(s), this information is transferred to the server content management process 210 via an upstream communication channel, DOCSIS modem, ISP connection, or other modality appropriate to the user's situation. The user's selection (e.g., availability) and payment information are then validated, such as by accessing a subscriber database associated with that user (as determined by, e.g., TUNER ID, MAC, or other information uniquely identifying the requesting CPE/subscriber.

Menus or other user interfaces may also be generated for receiving user preferences (e.g., format, particular versions of the same content, codec selection, upload configuration etc.). This information can be transmitted to the head-end at time of selection, or alternatively pre-stored in a configuration file disposed in the head-end or other location directly accessible to SCM 210).

Next, per step 506, the purchased/requested content is delivered to a storage facility at the headend 150 (if not already there), such as a local storage device 212 shown in FIG. 2. In one embodiment, the user's content selections and preferences, which may be received either at time of purchase or pre-stored, are received by the SCM 210.

Selected content is optionally encoded or recoded as required (e.g., such as where the content requires encoding into the format requested by the user). The content can alternatively be coded "on the fly", such as immediately preceding streaming over a VOD session.

Note that storage need not necessarily occur at this stage of the method 500 (or at all); rather, in another variant the SCM 210 merely identifies and validates the subscriber and permits access to content that has already been stored or that is available for streaming.

In one embodiment, the system provides a storage optimization algorithm rendered as a computer program running within the architecture (i.e., either at the head-end, the client device, or as a distributed application as described elsewhere). The optimization algorithm may be structured to store content in a more space-efficient and operationally efficient manner. In one variant, the storage optimization determines whether a content item has already been uploaded/stored to the head-end. If the content item has already been uploaded once, the content optimization algorithm may prevent or delete duplicate copies from being stored or uploaded at the head-end. The algorithm may operate with respect to the network storage space associated with an individual user, or alternatively to the network storage space of multiple users or even the local storage of the head-end or network storage as a whole. To that end, the MSO head-end saves space by building a database or library of content that has been uploaded in network storage space by subscribers and using that database as a source for future requests of content. If there is a request for a content item that has been already uploaded but requires different personalizations or encodings, the SCM 210 may access the content item stored in the network storage device 214 and apply the differences before delivering the content item to the requesting device. The requesting device may or may not be required to be grouped or linked with the subscriber account associated with the uploaded content.

In step 508, the content is delivered to the target device (e.g., customer CPE 202 or client device 206) via a communication channel. The content is transmitted to the requesting CPE or client device, such as via a session between the content server and the CPE (e.g. VOD) that transmits the content over one or more in-band downstream QAMs. Alternatively, delivery may occur via a broadcast (e.g., BSA) mode, an IPTV (e.g., MPEG over IP) mode, via satellite link, or any other mode having suitable bandwidth and quality of service (QoS).

Delivery may also occur to remote or visited networks; e.g., to client devices that are outside the MSO or "local" delivery network. Co-owned and co-pending U.S. patent application Ser. No. 11/440,490 filed May 24, 2006 entitled "PERSONAL CONTENT SERVER APPARATUS AND METHODS", previously incorporated herein by reference in its entirety, discloses exemplary apparatus and methods for delivery of content to remote client devices and networks, although it will be recognized that other apparatus and techniques may be used for this purpose. Accordingly, it will be appreciated that the methodology of FIG. 5 advantageously is substantially agnostic to the bearer medium, and amenable to redirection (i.e., requesting, customizing, receiving, and uploading the content can all be conducted at different locations or using different platforms).

In other variants, a user session based on the Session Initiation Protocol (SIP) is used for delivery, whether with the same or another bearer medium such as a non-VOD approach, or a WAP Wireless Session Protocol (WSP) session disposed on a handheld device, and so forth. It is noted that in such SIP or WAP variants, the initiating device need not necessarily be the target device (e.g., DSTB) to which the content is streamed. Rather, the SIP or WAP-enabled device can act as a session proxy for the DSTB or other target CPE, such as where the user utilizes their SIP-enabled PDA to communicate with a head-end or other content-providing network entity to establish the download session.

The aforementioned VOD or other session (or user-specific broadcast in the BSA variant) may be initiated promptly, e.g., automatically upon authorization of the transaction, or alternatively at another time selected by either the MSO or the user (such as, e.g., at a pre-determined day or date when the content is to be released). Similarly, if the target CPE (e.g., DSTB) has multiple RF tuners and one is available, data/content streaming or download can be initiated immediately, or as soon as a tuner becomes available when all are initially in use. Likewise, if the CPE has a single tuner, the data/content streaming or download is initiated when that single tuner is free.

The foregoing transmission or delivery logic can also be masked with other requirements if desired, such as where both a free tuner and the permitted viewing start time falling within a prescribed temporal window are required (i.e., viewing or access is valid only for a certain "aging" period), or where the user acknowledges a splash screen or comparable mechanism acknowledging the copyright of the content to be viewed (akin to a physical DVD, where the user's DVD player controls are ineffective during the copyright notice portions), and the restrictions on its use. Masking may also be based on network status or bandwidth availability, such as where the session will not be instantiated until sufficient bandwidth is available to provide a sufficiently high assurance of completing the streaming or download (and/or upload).

Upon receipt, the target device either conducts playback of the content, such as the playing of an MPEG-2 stream, or alternatively the playback of a compressed video file downloaded at high speed, or even the installation and execution of an application. In response to the receipt of content, a notification may be sent upstream that includes recording information about the content item.

It will be appreciated that the delivery of the content may occur immediately, e.g., immediately after or even contemporaneous with storage (if used) or buffering, and/or may occur at a subsequent time or date, depending on the purchaser's preferences.

In step 510, the CPE 202 or client device 206 uploads the received content to a designated network host. The designated network host may be a server 208 in the headend 150, or network storage space not located and/or directly associated with the MSO server. In one variant, the server 208 receives the uploaded content and redirects the content to its associated network storage space 214. Content may be uploaded on an upstream channel of the cable network or through a remote network as previously described. In one variant, content may be uploaded by transferring the content to a connected user device and using the connected user device to upload the content. For example, a CPE 202 may, in response to a user request, transfer content (e.g., via a premises network connection, USB connection, etc.) to a client device which is configured to upload the content contemporaneously with or as an alternative to the upload function of the CPE 202. The request may come from a user of the CPE 202 or a remote client device. In one variant, only a portion of the whole program content is transferred to the connected user device.

In one variant, the content is transferred to a second premises device and uploaded to the network storage from there, in response to a determination that insufficient upload bandwidth or tuner availability at a first premises device will frustrate upload of content to the head-end. For instance, the received content may be transferred via wired or wireless interface to the upload session will not be instantiated until sufficient bandwidth is available to provide a sufficiently high assurance of completing the upload. Alternatively, content is transferred upon determination that another premises device will upload data more efficiently.

In one embodiment, the system provides an upload prioritization algorithm rendered as a computer program running within the architecture (i.e., either at the head-end, the client device, or as a distributed application as described elsewhere). The upload prioritization algorithm contains an upload queue and may schedule and/or rank multiple upload events. In one variant, content items may be cross referenced with a database stored within the system 200 or contain metadata that indicates the importance that a particular item is uploaded. The upload prioritization algorithm interprets the upload priority information and schedules upload events accordingly. For example, Content Item A has an upload priority of 10, Content Item B has an upload priority of 5, and Content Item C has an upload priority of 1. Upon receiving and interpreting this data, the upload prioritization algorithm schedules Content Item A for immediate upload, Content Item B for upload next week, and Content Item C for upload not necessary or only upon user request. As such, the system is able to adapt to varying requirements for digital rights as set by content owners or the MSO while preserving upload bandwidth for items where upload may not be necessary.

In another embodiment, the CPE 202 is configured to upload content periodically. After a predetermined period of time, the CPE 202 determines if any new or updated content has been stored and uploads the new or updated content. Content may be considered new or updated if all or a portion of the files associated with the stored content have changed since the last upload occurred. The CPE 202 may maintain a list or database of content items that have been stored or are scheduled to be stored. In one variant, the database includes information about the stop and start times of download, upload and record events. Alternatively, the CPE 202 may indicate changes to content and the start and stop times of download, upload, and record events in the metadata associated with the content. As an illustrated example, a CPE 202 may be configured to upload content every Monday at 12:00 PM. The CPE 202 scans its records for new content on Monday at 12:00 PM, finds content item A was stored the previous Saturday, adds item A to an automatic upload queue and indicates the appropriate changes in a database and/or metadata.

In one embodiment, the CPE 202 is configured to automatically upload content upon reception of the content. In one variant, the CPE 202 is configured to automatically upload content once it has been received and/or after a predetermined time occurs/lapses after reception. Content may be considered received when reception of the content begins, when storage of the content has been completed, or at a time in between those two stages (i.e., a predetermined percentage of content has been downloaded and stored). In one variant, the CPE 202 parses the content in a memory buffer so that portions of the content may be uploaded to the network before the entirety of the content item has been received at the CPE 202.

In one embodiment, a flag or marker may be stored and/or transmitted by the client content management process 204 on the CPE 202 to indicate reception of content. The flag may identify a content item to an internal or external process as new content that has been received. Alternatively, the flag may indicate that a search or query should be performed by an internal or external process to identify new content on the CPE 202. The head-end or CPE may initiate an upload in response to receiving the flag.

In one embodiment, the CPE 202 is configured to automatically upload content in response to an event. In one instance, content upload is performed after a predetermined number of content items have been received at the CPE 202. Alternatively, content upload is performed when the server 208 has delivered a predetermined number of content items. In another variant, content upload my performed when storage space on the CPE 202 hard drive has exceeded a predetermined capacity.

In one embodiment, the determination of new content is performed by the server content management process 210 at the headend. When content is delivered to the subscriber, the SCM 210 updates a database that tracks the reception of content by the CPE 202. The database may be stored at the CPE 202, the headend 150, or network storage devices located offsite. In response to a lapsed period of time, event, or request, the SCM 210 accesses the database to determine if the CPE 202 has received content that has not yet been uploaded and if so, sends a command to the CPE 202 to initiate an upload of the new content. Alternatively, the server content management process 210 may query files stored on the CPE 202 to determine if new content exists.

In one embodiment, individual storage space is allocated for each CPE 202. The allocated storage space may be expanded or reduced based on various business considerations and/or the subscription agreement between the operator and user. Content that is uploaded is stored at the head-end or network storage device 214 and then made available for subsequent access. Additionally, the content may be encrypted before being uploaded to the head-end.

In one embodiment, when a plurality of users have requested, downloaded or uploaded the same content item (s), the storage optimization algorithm discussed above may store fewer or a single instance of the content item at the network storage device to prevent or reduce multiple copies of the same content item. The storage optimization algorithm may dynamically adjust the number of content item(s) stored in the network according to the popularity of the item or according to a time that has been determined to be a time of high demand for at item or similar content items.

In another embodiment, the storage optimization algorithm determines whether a content item has already been uploaded by that user. If not, an upload is scheduled for content that has not yet been uploaded. If the content has already been uploaded, the storage optimization algorithm may remove the content from the local storage of the CPE 202 since the subscriber will be able to access and receive the content at a subsequent time from the network storage. In one variant, the SCM 210 or CCM 204 prompts the user with options for deleting local content that has already been uploaded. In another variant, a pre-stored configuration file stored on the CPE 220 or at the head-end is used to determine rules for removing duplicate copies of content. For example, the CPE 202 may be configured to prompt the user for duplicate removal only when the capacity of the CPE 202 hard disk space has exceeded a predetermined threshold. In yet another variant, removal or prompting for removal only occurs after a determination that both the content has already been uploaded and the content has been viewed at least once by the user.

An upload may be cancelled if the recording or storage of the content at the CPE 202 is interrupted or fails to complete. In one variant, the CPE 202 may automatically send a notification upstream to the head-end if the content item is not completely received. Alternatively, the head-end may determine that a recording is incomplete when it compares metadata (e.g., start/stop times of the recording, size, etc.) with data values known to be consistent with a complete recording of that particular content item.

It will be recognized that while certain aspects herein are described in terms of a specific sequence of steps of a method, these descriptions are only illustrative of a broader method and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the system disclosed and claimed herein.

While the above detailed description has shown, described, and pointed out novel features as applied to various embodiments, it will be understood that various omissions, substitutions, and changes in the form and details of the device or process illustrated may be made by those skilled in the art. This description is in no way meant to be limiting, but rather should be taken as illustrative of the general principles. The scope should be determined with reference to the claims.

What is claimed is:

1. A computerized method of managing digitally rendered content within a content delivery network configured for data communication with a plurality of computerized client devices, the computerized method comprising:
    causing storage of the digitally rendered content at a local storage location of a first computerized client device of the plurality of computerized client devices;
    determining whether the storage of the digitally rendered content at the local storage location of the first computerized client device is complete by comparing metadata associated with the digitally rendered content with one or more data values known to be consistent with a complete recordation of the digitally rendered content;
    based on the determining indicating that the storage of the digitally rendered content at the local storage location of the first computerized client device is complete, causing storage of the digitally rendered content (i) obtained from the first computerized client device of the plurality of computerized client devices, and (ii) at a first storage location of a cloud-based storage apparatus;
    causing transfer of the digitally rendered content from the first storage location to a second storage location, wherein the digitally rendered content is inaccessible by the first computerized client device at the second storage location and accessible by a second computerized client device at the second storage location; and
    based at least on data indicating that the second computerized client device has completed use of the digitally rendered content, causing transfer of the digitally rendered content from the second storage location back to the first storage location such that the digitally rendered content is removed from the second storage location.

2. The computerized method of claim 1, further comprising:
    receiving, from the second computerized client device, data representative of a request to access the digitally rendered content;
    wherein the transfer of the digitally rendered content from the first storage location to the second storage location is based at least on the receipt of the data representative of the request to access the digitally rendered content.

3. The computerized method of claim 1, further comprising:
    accessing data stored at a computerized network entity, the stored data related to prior activity associated with the digitally rendered content;
    based on the accessing, identifying at least a portion of the digitally rendered content that is a duplicate of at least a portion of digitally rendered content previously stored at the first storage location; and
    based at least on the identifying, preventing upload of the at least portion of the digitally rendered content that is duplicative of the at least portion of the digitally rendered content previously stored.

4. The computerized method of claim 3, further comprising tracking the data related to prior activity via instances of a client application program configured to run on respective ones of the first and the second computerized client devices, and (ii) uploaded to the computerized network entity.

5. The computerized method of claim 1, further comprising:
    accessing data stored at a computerized network entity, the stored data related to prior activity associated with the digitally rendered content;
    based on the accessing, identifying at least a portion of the digitally rendered content that is a duplicate of at least a portion of digitally rendered content previously stored within the cloud-based storage apparatus; and
    based at least on the identifying, preventing upload of the at least portion of the digitally rendered content that is duplicative of the at least portion of the digitally rendered content previously stored.

6. The computerized method of claim 1, further comprising:
    receiving the digitally rendered content in an encrypted format from a digital content source within the content delivery network; and
    causing decryption of the encrypted content utilizing cryptographic data provided by a network operator of the content delivery network;
    wherein the transfer of the digitally rendered content from the first storage location to the second storage location comprises transfer of the decrypted content to the second storage location.

7. The computerized method of claim 1, wherein the causing of the storage of the digitally rendered content (i) obtained from the first computerized client device of the plurality of computerized client devices, and (ii) at the first storage location of the cloud-based storage apparatus, comprises utilizing an upload prioritization algorithm to evaluate at least portions of the digitally rendered content with respect to one or more criteria, and assign a priority level to the digitally rendered content based at least on the evaluation.

8. The computerized method of claim 7, wherein the utilizing the upload prioritization algorithm to evaluate the at least portions of the digitally rendered content with respect to the one or more criteria comprises utilizing the upload prioritization algorithm to evaluate the metadata associated with the digitally rendered content, the metadata indicating an importance that the digitally rendered content is uploaded to the first storage location.

9. The computerized method of claim 1, wherein the causing of the storage of the digitally rendered content (i) obtained from the first computerized client device of the plurality of computerized client devices, and (ii) at the first storage location of the cloud-based storage apparatus, comprises causing a first upload of the digitally rendered content to the first storage location; and the computerized method further comprises:

periodically determining whether at least portions of the digitally rendered content stored at the first storage location of the cloud-based storage apparatus have changed since the first upload; and causing a second upload of the at least portions of the digitally rendered content which have changed since the first upload.

10. The computerized method of claim 9, wherein the periodically determining whether the at least portions of the digitally rendered content stored at the first storage location of the cloud-based storage apparatus have changed since the first upload comprises accessing a database to identify the data related to one or more stop and start times, the data related to the one or more stop and start times tracked via at least one client application computer program configured to run on the first computerized client device.

11. The computerized method of claim 1, further comprising, prior to the storage of the digitally rendered content at the local storage location of the first computerized client device of the plurality of computerized client devices, causing delivery of the digitally rendered content to a third computerized device of the plurality of computerized client devices;

wherein the obtainment of the digitally rendered content from the first computerized client device is based on at least one of (i) insufficient upload bandwidth or (ii) tuner availability, at the third computerized device such that upload of the digitally rendered content to the first storage location from the third computerized device is frustrated.

12. The computerized method of claim 1, wherein the obtainment of the digitally rendered content from the first computerized client device is based on an available local storage capacity of the first computerized client device falling below a prescribed threshold.

13. A computerized network apparatus configured to obtain and store digital content from one or more computerized client devices, the computerized network apparatus comprising:

a digital processor apparatus; and a storage apparatus in data communication with the digital processor apparatus and comprising at least one computer program thereon, the at least one computer program comprising a plurality of instructions which are configured to, when executed by the digital processor apparatus, cause the computerized network apparatus to:

obtain the digital content from a first computerized client device, wherein the obtainment of the digital content from the first computerized client device is based on receipt of data representative of a request from a second computerized client device to upload the digital content from the first computerized client device;

cause storage of the digital content at a first storage location of a cloud-based storage apparatus;

cause transfer of the digital content from the first storage location to a second storage location, wherein the digital content is inaccessible by the first computerized client device at the second storage location but accessible by the second computerized client device at the second storage location; and cause transfer of the digital content from the second storage location back to the first storage location, such that the digital content is accessible by the first computerized client device but not accessible by the second computerized client device.

14. The computerized network apparatus of claim 13, wherein the causation of the transfer accessible by the second computerized client device from the second storage location back to the first storage location is based at least on data indicating that the second computerized client device has completed use of accessible by the second computerized client device.

15. The computerized network apparatus of claim 13, wherein the obtainment of the digital content from the first computerized client device comprises obtainment of the digital content over a managed content distribution network, and the digital content is accessible by the second computerized client device at the second storage location over a third-party internetwork.

16. The computerized network apparatus of claim 13, wherein the plurality of instructions are further configured to, when executed by the digital processor apparatus, cause the computerized network apparatus to:

prior to the obtainment of the digital content from the first computerized client device, attempt an upload of the digital content from the second computerized client device; and cancel the upload of the digital content from the second computerized client device based on an incompletion of recordation of the digital content at the second computerized client device.

17. The computerized network apparatus of claim 16, wherein the plurality of instructions are further configured to, when executed by the digital processor apparatus, cause the computerized network apparatus to:

identify the incompletion of the recordation of the digital content at the second computerized client device, the identification comprising a comparison of metadata of the digital content with one or more data values known to be consistent with a complete recordation of the digital content.

18. Computer readable apparatus comprising a non-transitory storage medium, the non-transitory storage medium comprising at least one computer program having a plurality of instructions, the plurality of instructions configured to, when executed on a processing apparatus, cause a computerized apparatus to:

obtain digitally rendered content from a first computerized client device, the obtainment of the digitally rendered content from the first computerized client device comprising causation of a transfer of the digitally rendered content from an initial computerized device to the first computerized client device based on a determination that the first computerized client device will upload the digitally rendered content more efficiently than the initial computerized device;

cause storage of the digitally rendered content at a first storage location of a cloud-based storage apparatus; and cause storage of the digitally rendered content at a second storage location of a second computerized client device;

wherein the digitally rendered content is accessible to the second computerized client device from the second storage location.

19. The computer readable apparatus of claim 18, wherein the digitally rendered content is accessible from the first storage location to only one of the first computerized client device or the second computerized client device at a then-current time.

20. The computer readable apparatus of claim 18, wherein the digitally rendered content is inaccessible to the first computerized client device from the first storage location when the digitally rendered content is being accessed by the second computerized client device at the second storage location.

21. The computer readable apparatus of claim 18, wherein the obtainment of the digitally rendered content from the first computerized client device comprises and automatic upload of the digitally rendered content from the first computerized client device based on a number of requests for the digitally rendered content meeting or exceeding a prescribed threshold.

\* \* \* \* \*